US012620118B2

(12) United States Patent
Suzuki et al.

(10) Patent No.: US 12,620,118 B2
(45) Date of Patent: May 5, 2026

(54) SKELETON RECOGNITION METHOD, NON-TRANSITORY COMPUTER-READABLE RECORDING MEDIUM, AND GYMNASTICS SCORING ASSIST SYSTEM

(71) Applicant: Fujitsu Limited, Kawasaki (JP)

(72) Inventors: Tatsuya Suzuki, Kawasaki (JP); Yu Ishikawa, Kawawaki (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 18/356,043

(22) Filed: Jul. 20, 2023

(65) Prior Publication Data

US 2023/0368415 A1 Nov. 16, 2023

Related U.S. Application Data

(63) Continuation of application No. PCT/JP2021/009267, filed on Mar. 9, 2021.

(51) Int. Cl.
*G06T 17/00* (2006.01)
*G06T 7/70* (2017.01)
*G06V 10/44* (2022.01)

(52) U.S. Cl.
CPC ............... *G06T 7/70* (2017.01); *G06T 17/00* (2013.01); *G06V 10/44* (2022.01); *G06T 2207/20044* (2013.01)

(58) Field of Classification Search
CPC . G06T 7/70; G06T 17/00; G06T 2207/20044; G06T 2207/30221;
(Continued)

(56) References Cited

U.S. PATENT DOCUMENTS

2013/0195330 A1* 8/2013 Kim ........................ G06V 40/10
382/128
2018/0342009 A1* 11/2018 Suzuki .................... G06T 11/60
(Continued)

FOREIGN PATENT DOCUMENTS

CN 108229332 A 6/2018
JP H10-302070 A 11/1998
(Continued)

OTHER PUBLICATIONS

Yao, Y., Jafarian, Y., & Park, H. S. (2019). Monet: Multiview semi-supervised keypoint detection via epipolar divergence. In Proceedings of the IEEE/CVF international conference on computer vision (pp. 753-762). (Year: 2019).*
(Continued)

*Primary Examiner* — Stephen R Koziol
*Assistant Examiner* — Ashley Hytrek
(74) *Attorney, Agent, or Firm* — ArentFox Schiff LLP

(57) ABSTRACT

A skeleton recognition method includes extracting a plurality of first features presenting features of two-dimensional joint positions of a subject, based on two-dimensional input images that are input from a plurality of cameras that capture images of the subject generating, based on the first features, second feature group information containing a plurality of second features corresponding to a given number of joints of the subject, respectively sensing an abnormal second feature from the second feature group information and recognizing a 3D skeleton based on a result of integrating the second features that remain after removal of the abnormal second feature from the second feature group information, by using a processor.

12 Claims, 21 Drawing Sheets

(58) Field of Classification Search

CPC ........ G06T 7/292; G06V 10/44; G06V 10/62; G06V 20/64; G06V 40/23

See application file for complete search history.

(56) References Cited

U.S. PATENT DOCUMENTS

| | | | | |
|---|---|---|---|---|
| 2019/0251341 A1* | 8/2019 | Nie | ........................ | G06V 20/46 |
| 2020/0202538 A1* | 6/2020 | Hsu | ........................... | G06T 7/50 |
| 2020/0210692 A1* | 7/2020 | Asayama | .............. | G06V 40/23 |
| 2021/0216759 A1 | 7/2021 | Asayama et al. | | |
| 2022/0108468 A1* | 4/2022 | Nakamura | ............... | G06T 7/73 |

FOREIGN PATENT DOCUMENTS

| | | | | | |
|---|---|---|---|---|---|
| JP | 2000-251078 A | | 9/2000 | | |
| JP | 7014304 B2 * | | 2/2022 | ........... | G06V 10/774 |
| WO | WO 2020/054442 A1 | | 3/2020 | | |
| WO | WO 2020/084667 A1 | | 4/2020 | | |

OTHER PUBLICATIONS

Chen, Long, Haizhou Ai, Rui Chen, Zijie Zhuang, and Shuang Liu. "Cross-view tracking for multi-human 3d pose estimation at over 100 fps." In Proceedings of the IEEE/CVF conference on computer vision and pattern recognition, pp. 3279-3288. 2020. (Year: 2020).*

Zhang, Zhe, Chunyu Wang, Wenhu Qin, and Wenjun Zeng. "Fusing Wearable IMUs with Multi-View Images for Human Pose Estimation: A Geometric Approach." arXiv preprint arXiv:2003.11163 (2020). (Year: 2020).*

International Search Report and Written Opinion in corresponding International Patent Application No. PCT/JP2021/009267 mailed May 25, 2021.

Japanese Notice of Reasons for Refusal issued in corresponding Japanese Patent Application No. 2023-504918, mailed Mar. 12, 2024.

Extended European Search Report of European Patent Application No. 21930063.9 dated Feb. 7, 2024.

Chen, L. et al., "Cross-View Tracking for Multi-Human 3D Pose Estimation at Over 100 FPS", 2020 IEEE/CVF Conference on Computer Vision and Pattern Recognition (CVPR), Jun. 1, 2020 (Jun. 1, 2020), pp. 3276-3285, XP093123211, DOI: 10.1109/CVPR42600.2020.00334, ISBN:978-1-7281-7168-5, Retrieved from the Internet: URL:https://openaccess.thecvf.com/content_CVPR_2020/papers/Chen_Cross-View_Tracking_for_Multi-Human_3D_Pose_Estimation_at_Over_100_CVPR_2020_paper.pdf.

Zhang, Z. et al., "Fusing Wearable IMUs With Multi-View Images for Human Pose Estimation: A Geometric Approach", 2020 IEEE/CVF Conference on Computer Vision and Pattern Recognition (CVPR), IEEE, Jun. 13, 2020 (Jun. 13, 2020), pp. 2197-2206, XP033805340, DOI: 10.1109/CVPR42600.2020.00227 [retrieved on Aug. 3, 2020].

Office Action mailed Dec. 4, 2025, for corresponding Chinese Patent Application No. 202180093006.6 (CNOA).

* cited by examiner

| CAMERA IDENTIFICATION INFORMATION | IMAGE FRAME |
|---|---|
| C30a | TIME-SERIES IMAGE FRAME CAPTURED BY CAMERA 30a |
| C30b | TIME-SERIES IMAGE FRAME CAPTURED BY CAMERA 30b |
| C30c | TIME-SERIES IMAGE FRAME CAPTURED BY CAMERA 30c |
| C30d | TIME-SERIES IMAGE FRAME CAPTURED BY CAMERA 30d |

| CAMERA IDENTIFICATION INFORMATION | FIRST FEATURE | SECOND FEATURE GROUP INFORMATION |
|---|---|---|
| C30a | INFORMATION OF K FIRST FEATURES | INFORMATION OF J SECOND FEATURES |
| C30b | INFORMATION OF K FIRST FEATURES | INFORMATION OF J SECOND FEATURES |
| C30c | INFORMATION OF K FIRST FEATURES | INFORMATION OF J SECOND FEATURES |
| C30d | INFORMATION OF K FIRST FEATURES | INFORMATION OF J SECOND FEATURES |

| VIEWPOINT OF INTEREST | COMBINATION OF VIEWPOINTS |
|---|---|
| v30a | (v30c, v30d) |
| v30b | NONE |
| v30c | (v30a, v30b) |
| v30d | (v30a, v30c) |

Figure 16:
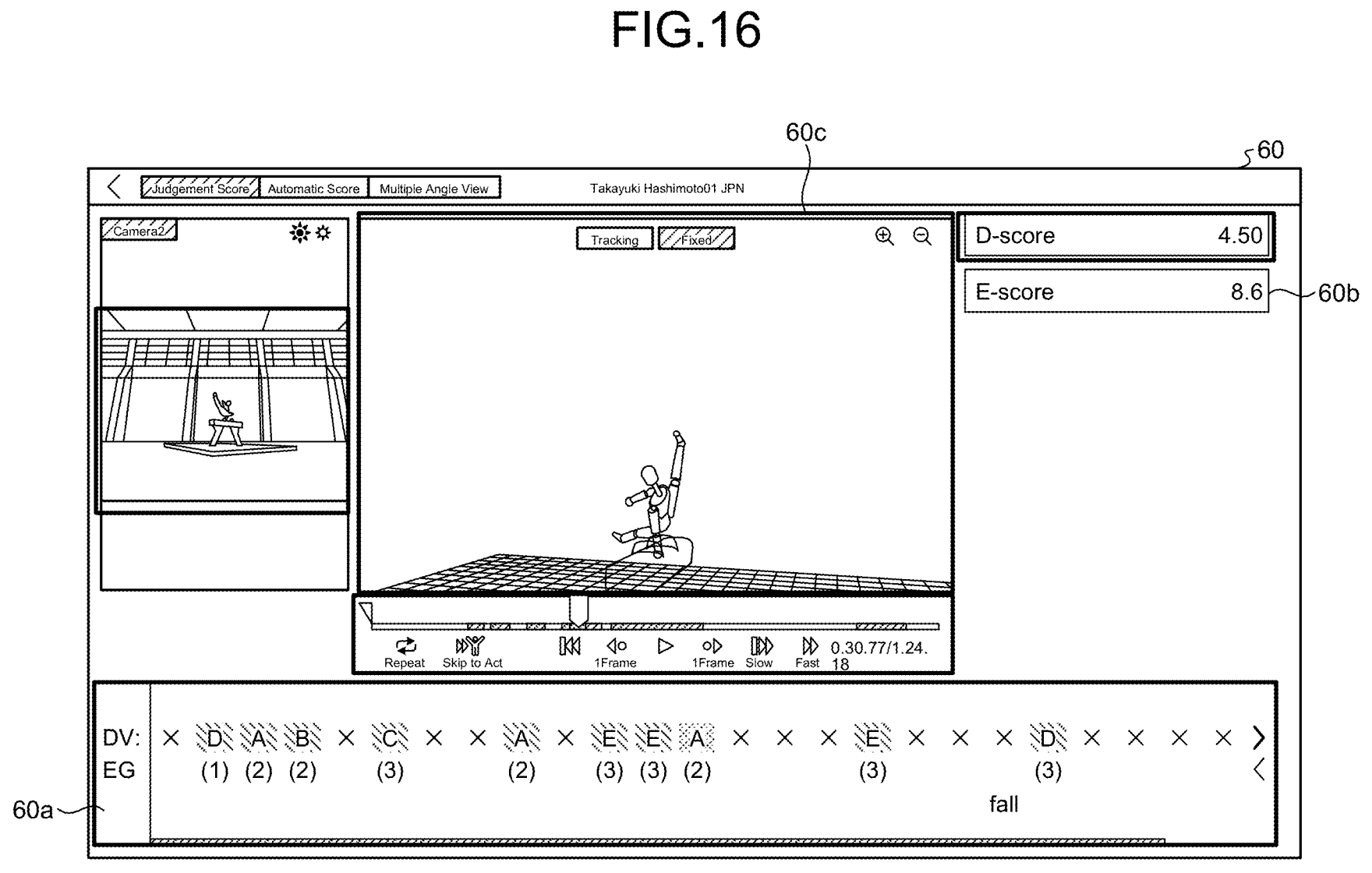

Takayuki Hashimoto01 JPN

| D-score | 4.50 |
| E-score | 8.6 |

Multiple Angle View

Automatic Score

Judgement Score

Camera2

☀

Tracking    Fixed

⊕ ⊖

0.30.77/1.24.

↺ Repeat    ⏩ Skip to Act    |◀◀    ◁o 1Frame    △    ▷ 1Frame    o▷ 1Frame    ◀◀ Slow    ▶▶ Fast 18

DV: × D A B × C × × A × E E A × × × E × × × × D × × × ∨
EG    (1)(2)(2)    (3)    (2)    (3)(3)(2)    (3)    (3)    fall    ∧

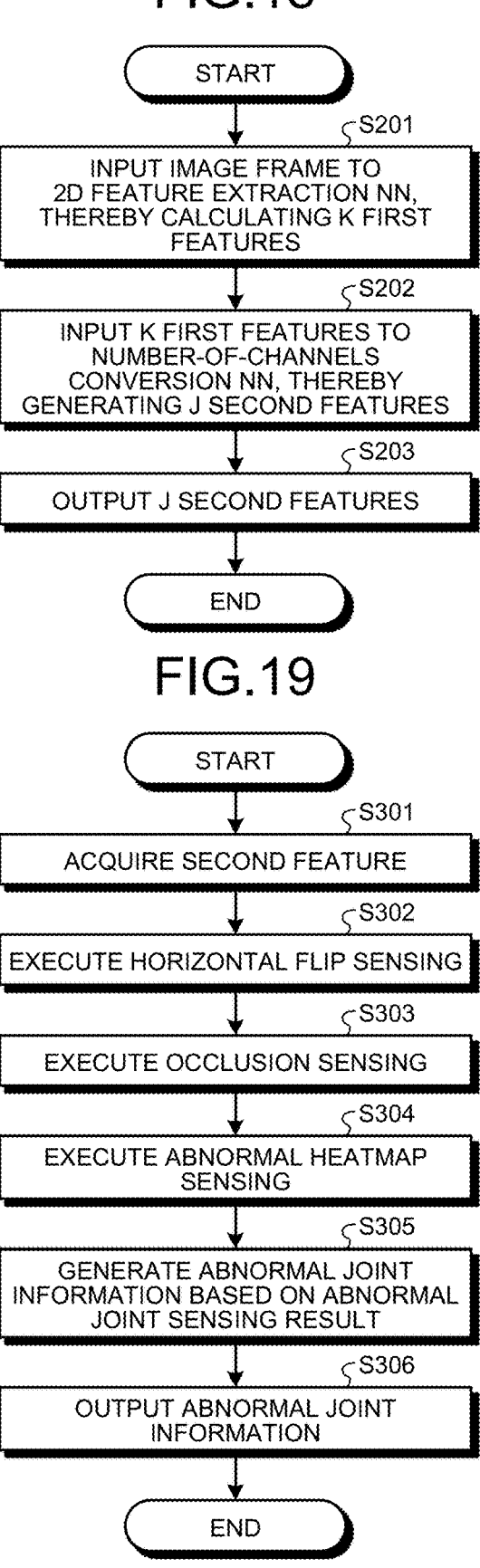

START

S201

INPUT IMAGE FRAME TO
2D FEATURE EXTRACTION NN,
THEREBY CALCULATING K FIRST
FEATURES

S202

INPUT K FIRST FEATURES TO
NUMBER-OF-CHANNELS
CONVERSION NN, THEREBY
GENERATING J SECOND FEATURES

S203

OUTPUT J SECOND FEATURES

END

FIG.19

START

S301

ACQUIRE SECOND FEATURE

S302

EXECUTE HORIZONTAL FLIP SENSING

S303

EXECUTE OCCLUSION SENSING

S304

EXECUTE ABNORMAL HEATMAP
SENSING

S305

GENERATE ABNORMAL JOINT
INFORMATION BASED ON ABNORMAL
JOINT SENSING RESULT

S306

OUTPUT ABNORMAL JOINT
INFORMATION

END

M1

Te1

| NUM-BER | JOINT NAME |
|---|---|
| 0 | SPINE_BASE |
| 1 | SPINE_MID |
| 2 | SPINE_SHOULDER |
| 3 | HEAD |
| 4 | SHOULDER_LEFT |
| 5 | ELBOW_LEFT |
| 6 | WRIST_LEFT |
| 7 | SHOULDER_RIGHT |
| 8 | ELBOW_RIGHT |
| 9 | WRIST_RIGHT |
| 10 | HIP_LEFT |
| 11 | KNEE_LEFT |
| 12 | ANKLE_LEFT |
| 13 | FOOT_LEFT |
| 14 | HIP_RIGHT |
| 15 | KNEE_RIGHT |
| 16 | ANKLE_RIGHT |
| 17 | FOOT_RIGHT |
| 18 | NECK |
| 19 | HAND_TIP_LEFT |
| 20 | HAND_TIP_RIGHT |

FIG.25

SKELETON RECOGNITION METHOD, NON-TRANSITORY COMPUTER-READABLE RECORDING MEDIUM, AND GYMNASTICS SCORING ASSIST SYSTEM

This application is a continuation application of International Application PCT/JP2021/009267 filed on Mar. 9, 2021 and designating U.S., the entire contents of which are incorporated herein by reference.

FIELD

The present invention relates to a skeleton recognition method and the like.

BACKGROUND

As for detection of three-dimensional human motions, a 3D sensing technique of detecting 3D skeleton coordinates from a plurality of 3D laser sensors with accuracy of ±1 cm has been established. The 3D sensing technique is expected to be applied to a gymnastics scoring assist system and to be developed to other sports and other fields. A method using 3D laser sensors is referred to as a laser method.

The laser method applies laser for about two million times per second and, based on the time of flight (ToF) of laser, calculates a depth of and information on each point of irradiation including a person of subject.

The laser method can acquire accurate depth data; however, because a configuration and a process of laser scan and ToF measurement are complicated, has a disadvantage that hardware is complicated and expensive.

3D skeleton recognition is sometimes performed by an image method instead of the laser method. The image method is a method of acquiring RGB (Red Green Blue) data of each pixel using a CMOS (Complementary Metal Oxide Semiconductor) imager, and an inexpensive RGB camera is usable.

A conventional technique of 3D skeleton recognition using 2D features with a plurality of cameras will be described here. After acquiring 2D features with each camera according to a human-body model that is defined in advance, the conventional technique recognizes a 3D skeleton using a result of integrating each 2D feature. For example, 2D skeleton information and headmap information are taken as the 2D features.

FIG. 22 is a diagram illustrating an example of a human-body model. As illustrated in FIG. 22, a human-body model M1 consists of 21 joints. In the human-body model M1, each joint is presented by a node and numbers of 0 to 20 are assigned to the nodes. The relationship between the numbers of nodes and joint names is the relationship presented in a table Te1. For example, the joint name corresponding to the node 0 is "SPINE BASE". Description of the joint names corresponding to the nodes 1 to 20 will be omitted.

Conventional techniques include a method using triangulation and a method using machine learning. The method using triangulation includes triangulation using two cameras and triangulation using three or more cameras. For convenience, triangulation using two cameras is Conventional Technique 1, triangulation using three or more cameras is Conventional Technique 2, and the method using machine learning is Conventional Technique 3.

FIG. 23 is a diagram for explaining triangulation using two cameras. In the conventional technique 1, triangulation is defined as a method of measuring a three-dimensional position of a subject P from a relationship of a triangle, using two cameras Ca1A and Ca1B. A camera image of the camera Ca1A is Im2A and a camera image of the camera Ca1B is Im2B.

A 2D joint position in the camera image Im2A of the subject P is $p_l(x_l,y_l)$. A 2D joint position in the camera image Im2A of the subject P is $p_r(x_r,y_r)$ A distance between the cameras is b and a focal point distance is f. In the conventional technique 1, the 2D joint positions $p_l(x_l, y_l)$ and $p_r(x_r, y_r)$ are features and a three-dimensional joint position (X,Y,Z) is calculated by Equations (1), (2) and (3). The origin of (X,Y,Z) is at an optical center of the two cameras Ca1A and Ca1B.

$$X = b(x_i + x_r)/2(x_i - x_r) \tag{1}$$

$$Y = b(y_i + y_r)/2(x_i - x_r) \tag{2}$$

$$Z = bf/(x_i - x_r) \tag{3}$$

According to Conventional Technique 1 described using FIG. 23, when incorrect 2D features are used to calculate a 3D skeleton, accuracy of the 3D skeleton lowers.

FIG. 24 is a diagram for describing triangulation using three cameras. In triangulation using three cameras, triangulation described using FIG. 23 is extended to three or more cameras and the best combination of cameras is estimated by an algorithm referred to as RANSAC (Random Sample Consensus).

As illustrated in FIG. 24, the apparatus of Conventional Technique 2 acquires 2D joint positions of a subject using all cameras 1-1, 1-2, 1-3 and 1-4 (step S1). The apparatus of Conventional Technique 2 chooses a combination of two cameras from all the cameras 1-1 to 1-4 and calculates 3D joint positions by triangulation described using FIG. 23 (step S2).

The apparatus of Conventional Technique 2 re-projects a 3D skeleton to all the cameras 1-1 to 1-4 and counts the number of cameras whose difference from the 2D joint positions is at or under a threshold (step S3). The apparatus of Conventional Technique 2 repeatedly executes processing of steps S2 and S3 and employs, as the best combination of camera, a combination of two cameras with which the number of cameras whose differences from the 2D joint positions are at or under the threshold is the largest (step S4).

Conventional Technique 2 described in FIG. 24 requires a processing time for searching for two cameras optimum in calculating a 3D skeleton.

Compared to the method using triangulation, the method using machine learning makes it possible to recognize a 3D skeleton with high accuracy and at high speed.

Figure 25:
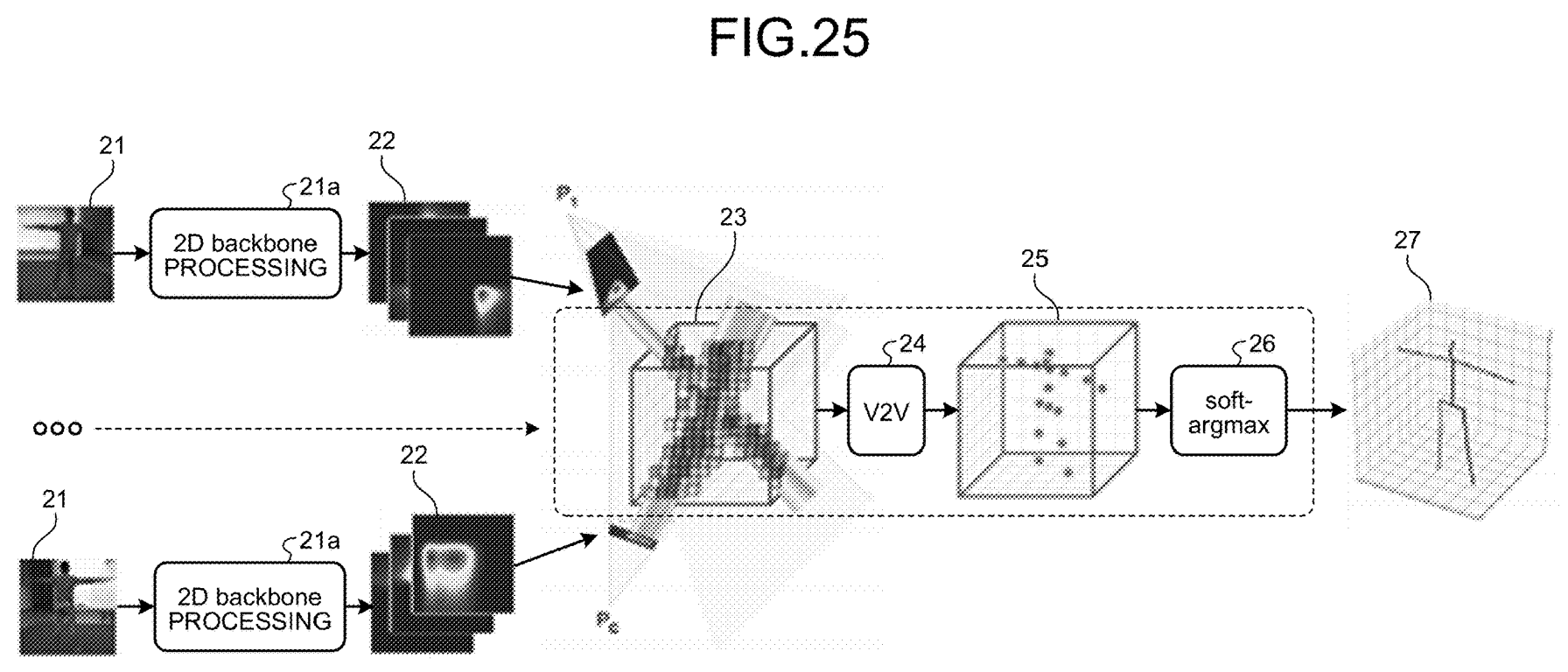

FIG. 25 is a diagram for describing a method using machine learning. Conventional Technique 3 using machine learning performs 2D backbone processing 21a on each of input images 21 that are captured by the respective cameras, thereby acquiring 2D features 22 representing respective joint features. Conventional Technique 3 performs back projection of each 2D feature 22 onto a 3D cube according to camera parameters, thereby acquiring aggregated volumes 23.

Conventional Technique 3 inputs the aggregated volumes 23 to a V2V (neural network, P3) 24, thereby acquiring processed volumes 25 representing likelihood of each joint. The processed volumes 25 correspond to a heatmap representing likelihood of each joint in 3D. Conventional Technique 3 executes soft-argmax 26 on the processed volumes 25, thereby acquiring 3D skeleton information 27.

For example, related arts are disclosed in Patent Literature 1: Japanese Laid-open Patent Publication No. 10-302070 and Patent Literature 2: Japanese Laid-open Patent Publication No. 2000-251078.

Conventional Technique 3 however has a problem that 3D skeleton recognition is sometimes executed using incorrect 2D features and it is not possible to obtain a correct s3D skeleton recognizing result.

FIG. 26 is a diagram for describing the problem of Conventional Technique 3. Here, a case where a 3D skeleton is recognized using four cameras 2-1, 2-2, 2-3 and 2-4 will be described as an example. Input images that are captured by the cameras 2-1, 2-2, 2-3 and 2-4 are input images Im2-1*a*, Im2-2*a*, Im2-3*a* and Im2-4*a*. The input image Im2-3*a* is an image in which it is difficult to see the face of the subject and to distinguish between the left and the right. In the input image Im2-4*a*, left knee occlusion occurs in an area Ar1.

In Conventional Technique 3, 2D features are calculated by performing the 2D backbone processing 21*a* on the input image Im2-1*a* and 2D skeleton information Im2-1*b* is generated according to the 2D features. Also as for the input images Im2-2*a*, Im2-3*a*, and Im2-4*a,* 2D features are calculated by performing the 2D backbone processing 21*a* and sets of 2D skeleton information Im2-2*b*, Im2-3*b* and Im2-4*b* are generated according to the 2D features. The sets of 2D skeleton information Im2-1*b* to Im2-4*b* present positions in the 2D skeleton.

Here, in the input image Im2-3*a*, because it is difficult to see the face of the subject, the relationship of the skeleton flips horizontally in an area Ar2 in the 2D posture information Im2-3*b*. Because of the effect of the left-knee occlusion occurring in the input image Im2-4*a*, features that relate to the left knee and in which a 2D skeleton is incorrect in the area Ar3 in the input image Im2-4*a* are captured.

Conventional Technique 3 calculates 3D skeleton recognizing results Im2-1*c*, Im2-2*c*, Im2-3*c*, and Im2-4*c* directly using the 2D features serving as the base of the 2D skeleton information Im2-1*b* to Im2-4*b*. In other words, because a 3D skeleton is recognized using the 2D features even when the 2D features corresponding to the 2D skeleton information Im2-3*b* and Im2-4*b* are incorrect, accuracy lowers. For example, in the example illustrated in FIG. 26, a significant decrease in accuracy occurs in the left knee with a lot of incorrect features.

SUMMARY

According to an aspect of the embodiment of the invention, skeleton recognition method includes extracting a plurality of first features presenting features of two-dimensional joint positions of a subject, based on two-dimensional input images that are input from a plurality of cameras that capture images of the subject; generating, based on the first features, second feature group information containing a plurality of second features corresponding to a given number of joints of the subject, respectively; sensing an abnormal second feature from the second feature group information; and recognizing a 3D skeleton based on a result of integrating the second features that remain after removal of the abnormal second feature from the second feature group information, by using a processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a data structure of a measurement table.

FIG. 6 is a diagram illustrating an example of a data structure of a feature table.

FIG. 10 is a diagram for describing self-occlusion sensing.

FIG. 15 is Diagram (2) for describing the second abnormal heatmap sensing processing.

FIG. 16 is a diagram illustrating an example of screen information.

FIG. 18 is a flowchart of a second feature generating process.

FIG. 19 is a flowchart of an abnormality sensing process.

FIG. 25 is a diagram for describing a method using machine learning.

DESCRIPTION OF EMBODIMENTS

An embodiment of a skeleton recognition method, a skeleton recognition program, and a gymnastics scoring assist system disclosed by the present application will be described in detail below according to the drawings. Note that the embodiment does not limit the present invention.

Embodiment

Figure 1:
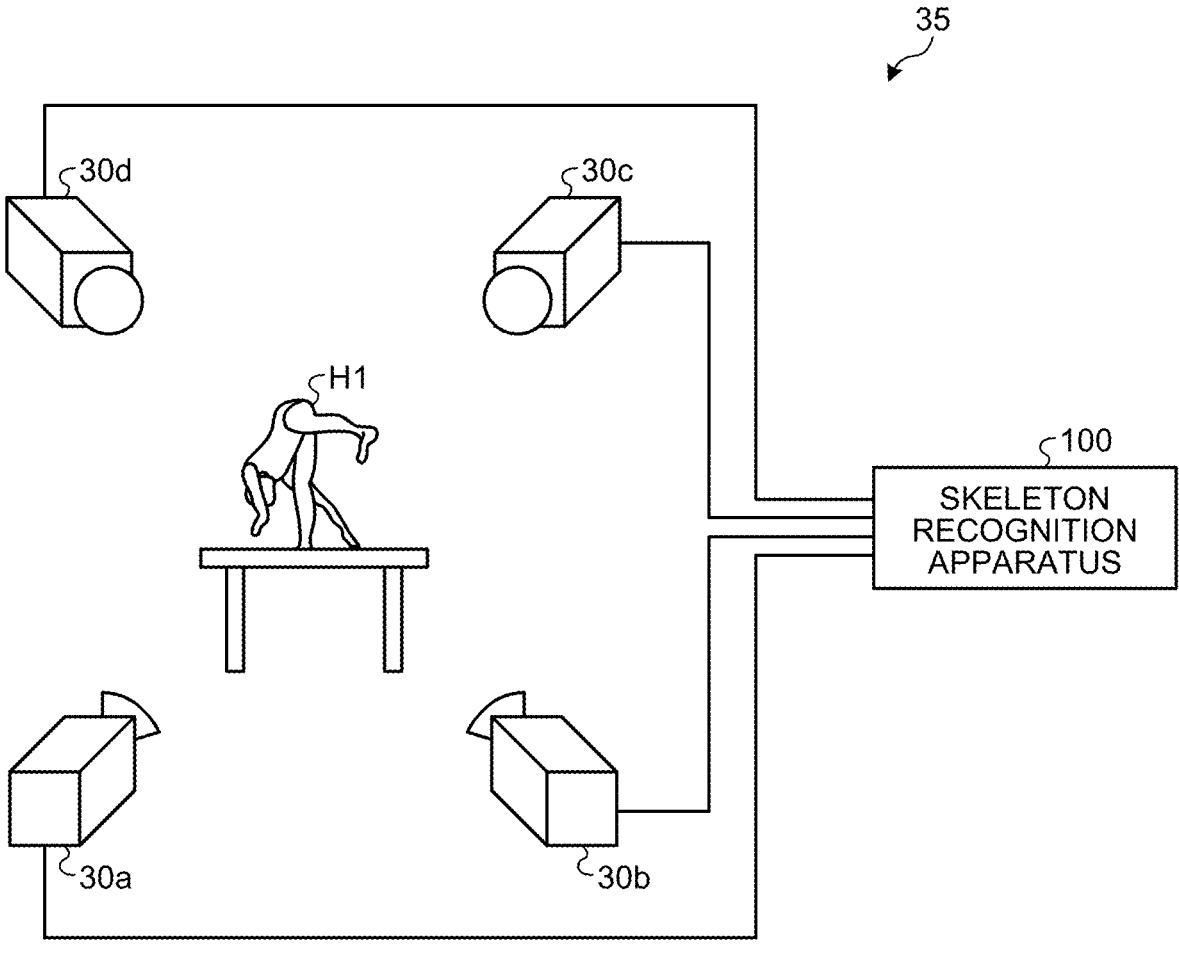
FIG. 1 is a diagram illustrating an example of a gymnastics scoring assist system according to an embodiment.

FIG. 1 is a diagram illustrating an example of a gymnastics scoring assist system according to an embodiment. As illustrated in FIG. 1, a gymnastics scoring assist system 35 includes cameras 30a, 30b, 30c and 30d and a skeleton recognition apparatus 100. The cameras 30a to 30d and the skeleton recognition apparatus 100 are connected with each other with wires or wirelessly. FIG. 1 illustrates the cameras 30a to 30d, and the gymnastics scoring assist system 35 may further include another camera.

In the embodiment, a subject H1 does a continuous performance on an apparatus as an example; however, embodiments are not limited to this. For example, the subject H1 may do a performance in a place without apparatus or may take actions other than a performance.

The camera 30a is a camera that captures an image of the subject H1. The camera 30a corresponds to a CMOS imager, an RGB camera, or the like. The camera 30a sequentially captures images at a given frame rate (frame per second: FPS) and transmits data of the images in time series to the skeleton recognition apparatus 100. In the following description, data of an image among data of a plurality of sequential images is referred to as an "image frame". Frame numbers are assigned in time series to the image frames.

Description of the cameras 30b, 30c and 30d is the same as that of the camera 30a. In the following description, the cameras 30a to 30d will be collectively denoted as a "camera 30" below.

The skeleton recognition apparatus 100 acquires an image frame from the camera 30 and, based on the image frame, generates a plurality of second features corresponding to joints of the subject H1, respectively. The second features is a heatmap representing likelihood of each joint position. Second features corresponding to each joint are generated from one image frame that is acquired from one camera. For example, the number of joints is 21 and the number of cameras is 4, 84 second features are generated per image frame.

Figure 2:
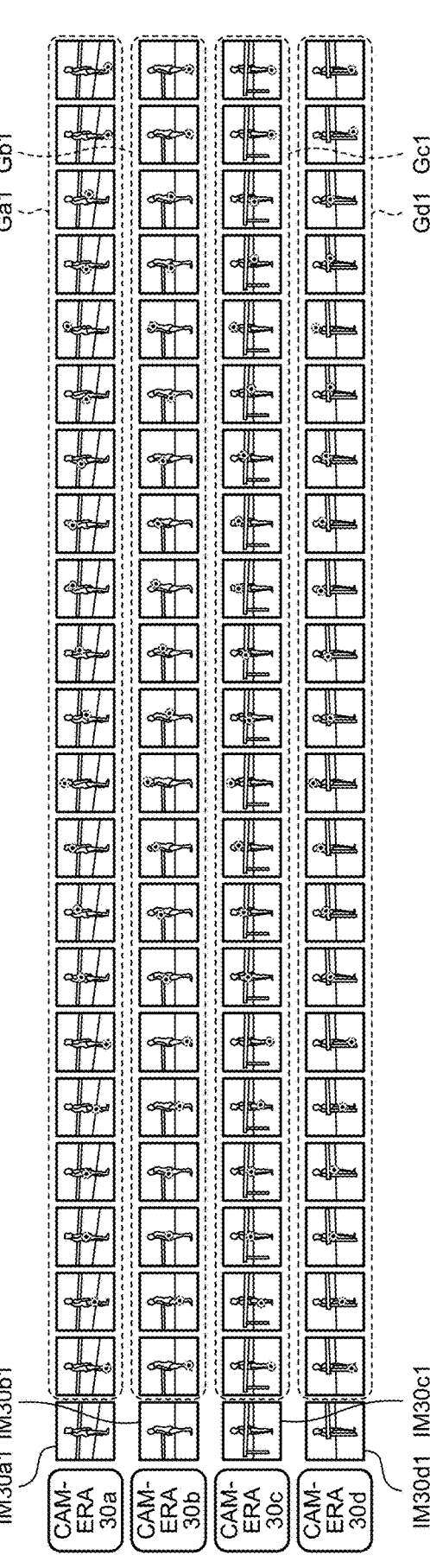
FIG. 2 is a diagram for describing 2D features.

FIG. 2 is a diagram for describing the second features. An image frame Im30a1 illustrated in FIG. 2 is an image frame that is captured by the camera 30a. An image frame Im30b1 is an image frame that is captured by the camera 30b. An image frame Im30c1 is an image frame that is captured by the camera 30c. An image frame Im30d1 is an image frame that is captured by the camera 30d.

The skeleton recognition apparatus 100 generates second features group information Ga1 based on the image frame Im30a1. 21 second features corresponding to the respective joints are contained in the second features group information Ga1. The skeleton recognition apparatus 100 generates second features group information Gb1 based on the image frame Im30b1. 21 second features corresponding to the respective joints are contained in the second features group information Gb1.

The skeleton recognition apparatus 100 generates second features group information Gc1 based on the image frame Im30c1. 21 second features corresponding to the respective joints are contained in the second features group information Gc1. The skeleton recognition apparatus 100 generates second features group information Gd1 based on the image frame Im30d1. 21 second features corresponding to the respective joints are contained in the second features group information Gd1.

Figure 3:
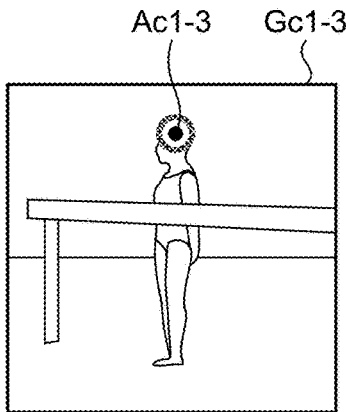
FIG. 3 is a diagram illustrating a 2D feature.

FIG. 3 is a diagram illustrating a second feature. A second feature Gc1-3 illustrated in FIG. 3 is a second feature corresponding to a joint "HEAD" among the second features contained in the second features group information Gd1. Likelihood is set in each pixel of the second feature Gc1-3. In FIG. 3, colors corresponding to the values of likelihood are set. A spot with the largest likelihood serves as coordinates of the corresponding joint. For example, it is possible to specify, in the feature Gc1-3, that an area Ac1-3 with the largest value of likelihood serves as coordinates of the joint "HEAD".

The skeleton recognition apparatus 100 senses an abnormal second feature from the second features contained in the second features group information Ga1 and removes the sensed abnormal second feature from the second features group information Ga1. The skeleton recognition apparatus 100 senses an abnormal second feature from the second features contained in the second features group information Gb1 and removes the sensed abnormal second feature from the second features group information Gb1.

The skeleton recognition apparatus 100 senses an abnormal second feature from the second features contained in the second features group information Gc1 and removes the sensed abnormal second feature from the second features group information Gc1. The skeleton recognition apparatus 100 senses an abnormal second feature from the second features contained in the second features group information Gd1 and removes the sensed abnormal second feature from the second features group information Gd1.

The skeleton recognition apparatus 100 integrates the sets of second features group information excluding the abnormal second features and, based on the result of integration, recognizes a 3D skeleton.

As described above, the skeleton recognition apparatus 100 generates the second features that are associated with the joints of the subject H1, respectively, based on an image frame and recognizes a 3D frame using a result of synthesizing the remaining second features from which the second features in which abnormality is sensed have been excluded. This makes it possible to obtain a result of recognizing a correct 3D skeleton.

Figure 4:
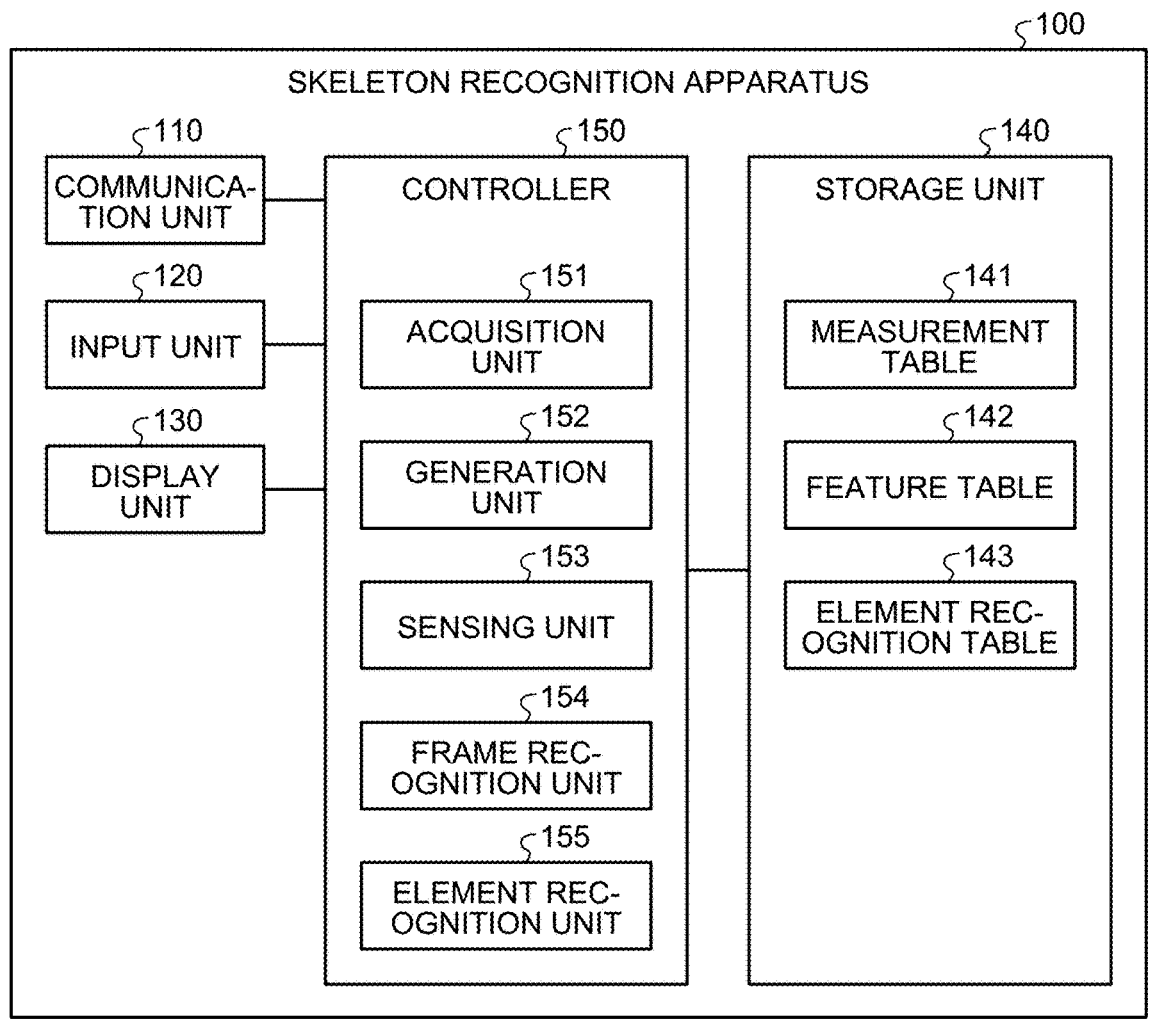
FIG. 4 is a functional block diagram illustrating a configuration of a skeleton recognition apparatus according to the embodiment.

An example of a configuration of the skeleton recognition apparatus 100 according to the embodiment will be described next. FIG. 4 is a functional block diagram illustrating a configuration of a skeleton recognition apparatus according to the embodiment. As illustrated in FIG. 4, the skeleton recognition apparatus 100 includes a communication unit 110, an input unit 120, a display unit 130, a storage unit 140, and a controller 150.

The communication unit 110 receives an image frame from the camera 30. The communication unit 110 outputs the received image frame to the controller 150. The communication unit 110 is an example of the communication apparatus. The communication unit 110 may receive data from an external device not illustrated in the drawing.

The input unit 120 is an input device that input various types of information to the controller 150 of the skeleton recognition apparatus 100. The input unit 120 corresponds to a keyboard, a mouse, a touch panel, etc. The user operates the input unit 120 to make a request to display screen information and perform an operation on the screen, etc.

The display unit 130 is a display device that displays information that is output from the controller 150. For example, the display unit 130 displays screen information on element recognition of various types of events, a scoring result, etc. The display unit 130 corresponds to a liquid crystal display, an organic EL (Electro-Luminescence) display, a touch panel, or the like.

The storage unit 140 includes a measurement table 141, a feature table 142, and an element recognition table 143. The storage unit 140 corresponds to a semiconductor memory device, such as a RAM (Random Access Memory) or a flash memory, or a storage device, such as a HDD (Hard Disk Drive).

The measurement table 141 is a table that stores image frames that are captured by the camera 30 in series. FIG. 5 is a diagram illustrating an example of a data structure of the measurement table. As illustrated in FIG. 5, the measurement table 141 associates camera identification information and image frames.

The camera identification information is information that uniquely identifies cameras. For example, camera identification information "C30*a*" corresponds to a camera 30*a*, camera identification information "C30*b*" corresponds to a camera 30*b*, camera identification information "C30*c*" corresponds to a camera 30*c*, and camera identification information "C30*d*" corresponds to a camera 30*d*. An image frame is an image frame in time series that is captured by the corresponding camera 30. Frame numbers are set in time series in the respective image frames.

The feature table 142 is a table that stores information on second features. FIG. 6 is a diagram illustrating an example of a data structure of the feature table. As illustrated in FIG. 6, the feature table 142 includes camera identification information, first features, and second features group information. Description of the camera identification information is the same as that of the camera identification information described using FIG. 5.

First features are features information on joints of the subject H1 that are calculated by executing 2D backbone processing on one image frame. K first features are generated per camera from one image frame. In other words, K first features are generated per frame and per camera and are stored in the feature table 142. Note that "K" is a number different from the number of joints and is a number larger than the number of joints.

The second feature group information includes J second features corresponding to the joints, respectively. J second features are generated from K first features that are generated from one image frame. J second features are generated per camera. In other words, J second features are generated per image frame and each camera and are stored in the feature table 142. Note that "J" is a number equal to the number of joints "21" and the respective second features correspond to the respective joints. Description of the second feature group information corresponds to the content described using FIG. 2.

Although illustration in the drawings is omitted, frame numbers of corresponding image frames are set in information of the K first features and information of the J second features.

Back to description of FIG. 4. The element recognition table 143 is a table that associates changes in the position of each joint over time contained in each frame recognition result and the type of element. The element recognition table 143 associates a combination of types of element and a score. A score is calculated by summing a D (Difficulty) score and an E (Execution) score. For example, the D score is a score that is calculated based on difficulty of the element. The E score is a score that is calculated by a point deduction method according to completion of the element.

The controller 150 includes an acquisition unit 151, a generation unit 152, a sensing unit 153, a skeleton recognition unit 154, and an element recognition unit 155. The controller 150 is realized by a hard-wired logic, such as a CPU (Central Processing Unit) or a GPU (Graphics Processing Unit), an ASIC (Application Specific Integrated Circuit), or a FPGA (Field Programmable Gate Array).

The acquisition unit 151 acquires image frames in time series from the camera 30 via the communication unit 110. The acquisition unit 151 stores the image frames acquired from the camera 30 in the measurement table 141 in association with the camera identification information.

Figure 7:
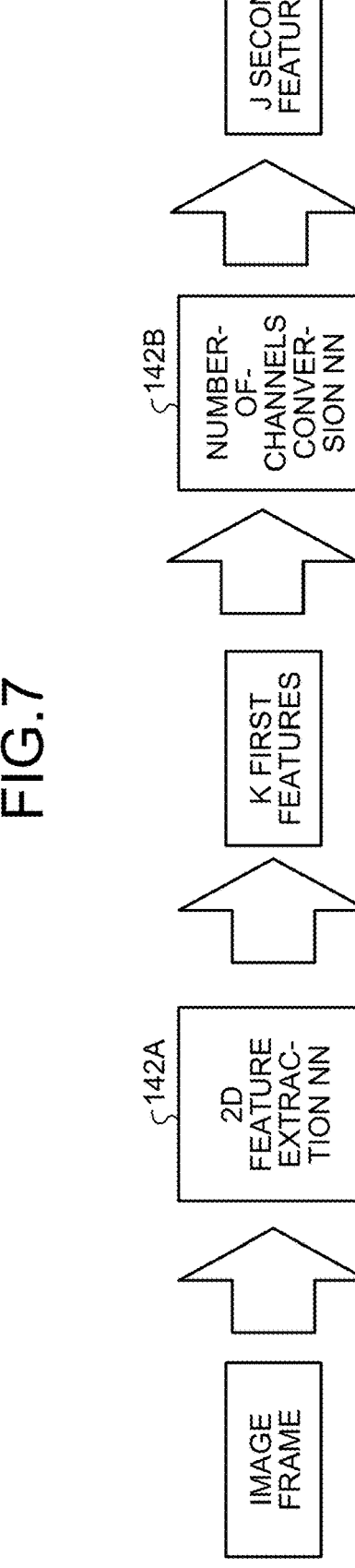
FIG. 7 is a diagram for describing a process by a generation unit.

The generation unit 152 generates the second feature group information based on the image frames. FIG. 7 is a diagram for describing a process by the generation unit. As illustrated in FIG. 7, the generation unit 152 utilizes a 2D feature extraction NN 142A and a number-of-channels conversion NN 142B.

The 2D feature extraction NN 142A corresponds to a NN (Neural Network), such as ResNet. When an image frame is input, the 2D feature extraction NN 142A calculates K first features based on a trained parameter and outputs the K first features. For example, one first feature is a 96×96 pixel image and likelihood on any one of the joints is set in each pixel. The K first features do not correspond to the joints, respectively. In the 2D feature extraction NN 142A, the parameter is trained (by machine learning) with training data previously.

The number-of-channels conversion NN 142B corresponds to a Conv2D layer of the NN, or the like. When K first features are input, the number-of-channels conversion NN 142B calculates J second features based on a trained parameter and outputs the J second features. The J second features correspond to the joints, respectively. In the number-of-channels conversion NN 142B, the parameter is trained (by machine learning) with training data previously.

The generation unit 152 acquires an image frame of the camera 30*a* from the measurement table 141 and inputs the acquired image frame to the 2D feature extraction NN 142A, thereby extracting K first features. The generation unit 152 registers the K first features in the feature table 142 in association with the camera identification information C30*a*.

The generation unit 152 inputs K first features to the number-of-channels conversion NN 142B, thereby generating J second features. The generation unit 152 registers the J second features in the feature table 142 in association with the camera identification information C30*a*. The generation unit 152 repeatedly executes the above-described process on each of the image frames of the camera 30*a* in time series, thereby generating J second features corresponding to the camera 30*a*.

Also as for the image frames of the cameras 30*b*, 30*c* and 30*d*, as in the case of the image frame of the camera 30*a*, the generation unit 152 extracts K first features and generates information of J second features. Note that a frame number is assigned to the K first features and the J second features.

For example, a frame number "n" is assigned to K first features that are extracted based on an image frame of a frame number "n". The frame number "n" is assigned to J second features (second feature group information) that are generated based on the K first features to which the frame number "n" is assigned.

The sensing unit 153 senses an abnormal joint based on information of the J second features that are stored in the feature table 142. For example, the sensing unit 153 executes horizontal flip sensing, self-occlusion sensing, abnormal heatmap sensing, thereby sensing an abnormal joint.

Horizontal flip sensing that the sensing unit 153 executes will be described. Description will be given here using second feature group information of a frame number n−1 and the second feature group information of the frame number n that are generated based on an image frame that the camera 30a captures.

The sensing unit 153 calculates coordinates of each joint based on the J second features that are contained in the second feature group information of the frame number n−1. For example, description will be given using a second feature Gc1-3 corresponding to the joint "HEAD" in FIG. 3. The sensing unit 153 calculates, as the coordinates of "HEAD", coordinates of a pixel in which the largest likelihood is set among sets of likelihood that are set in the respective pixels of the second feature Gc1-3. As for a second feature corresponding to another joint, the sensing unit 153 executes the same process and thus calculates coordinates (two-dimensional coordinates) of each joint of the frame number n−1.

The sensing unit 153 calculates coordinates of each joint based on the J second features contained in the second feature group information of the frame number n. The process of calculating coordinates of each joint based on the second feature group information of the frame number n, which is performed by the sensing unit 153, is similar to the process of calculating coordinates of each joint based on the second feature group information of the frame number n.

Figure 8:
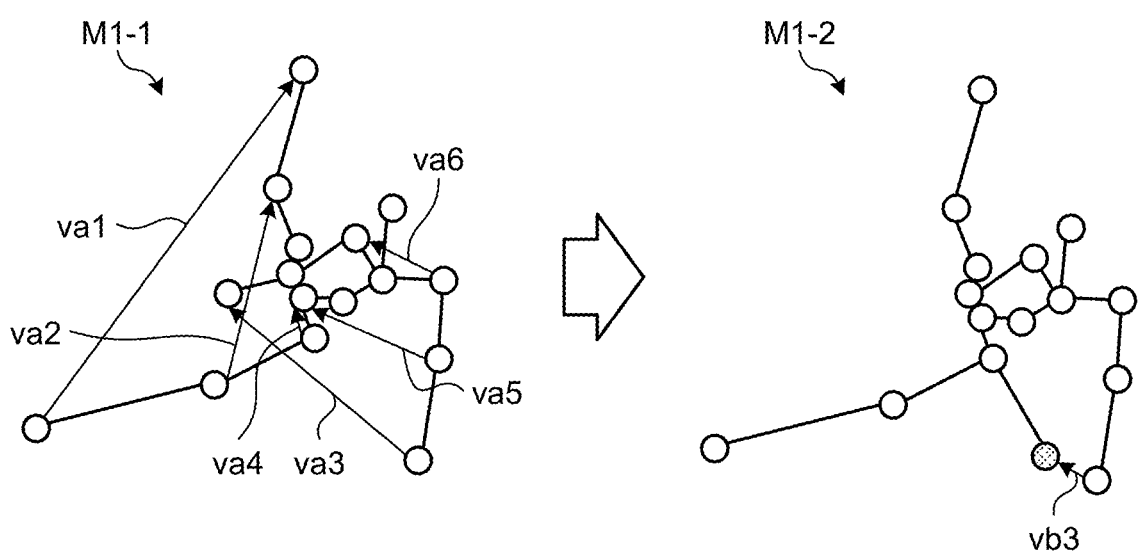
FIG. 8 is Diagram (1) for describing horizontal flip sensing.

FIG. 8 is Diagram (1) for describing horizontal flip sensing. In FIG. 8, a model M1-1 is two-dimensional frame information that is generated based on sets of coordinates of the respective joints of the frame number n−1. A model M1-2 is two-dimensional frame information that is generated based on sets of coordinates of the respective joints of the frame number n. For convenience of description, part of illustration of the joints is omitted in FIG. 8.

Figure 22:
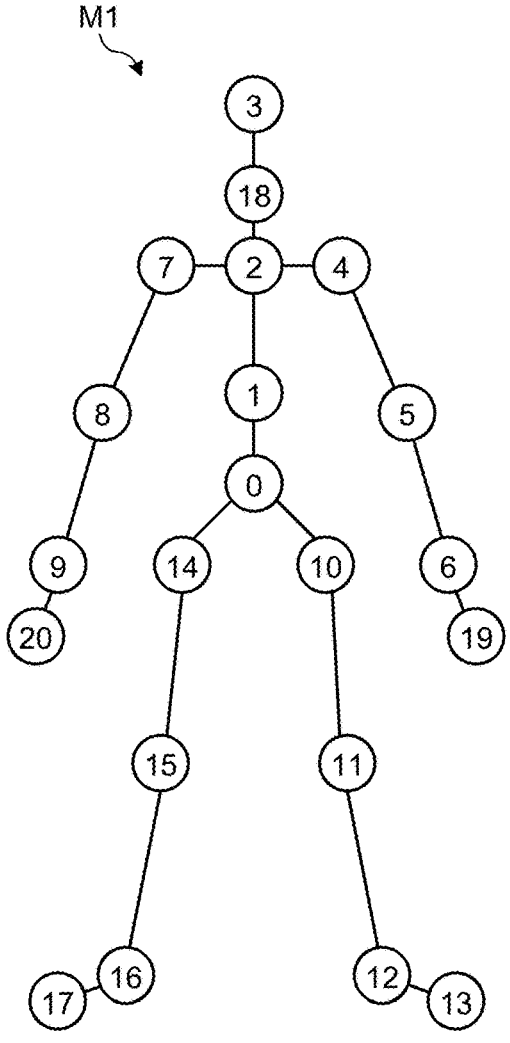
FIG. 22 is a diagram illustrating an example of a human model.
Figure 23:
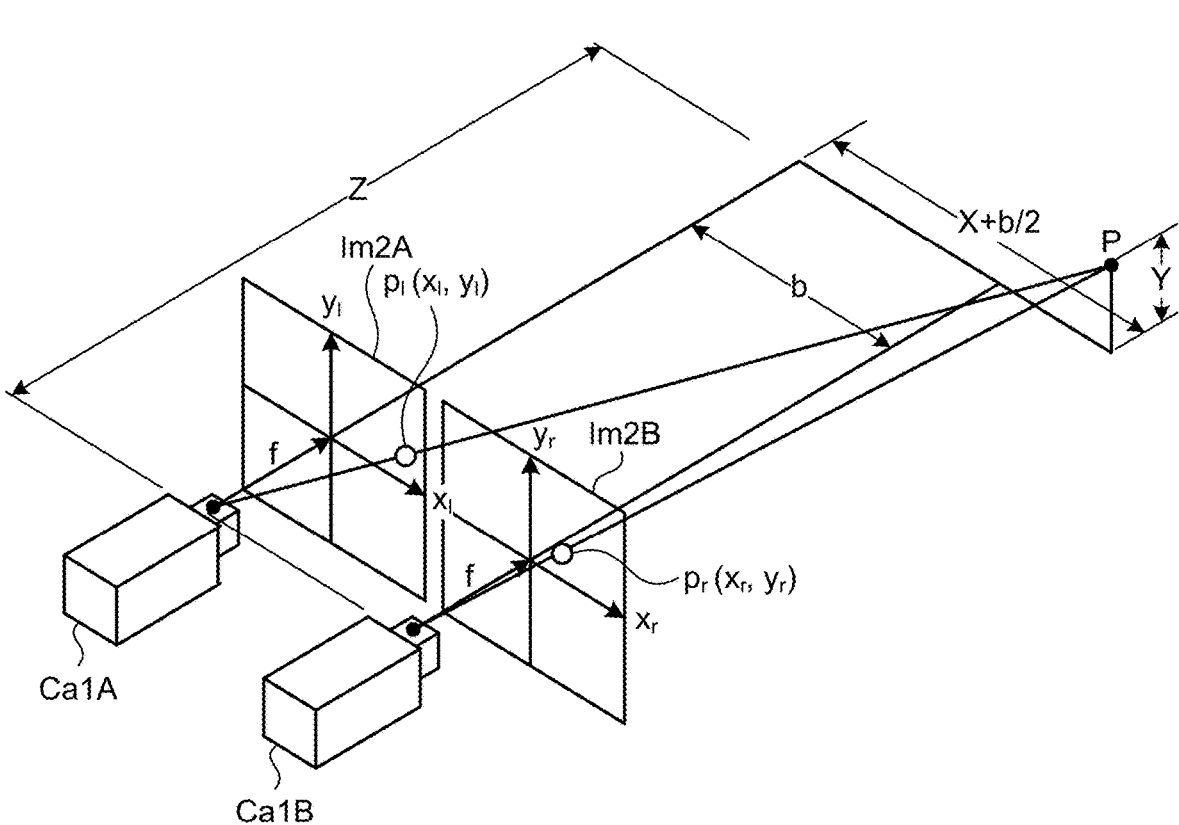
FIG. 23 is a diagram for describing triangulation using two cameras.
Figure 24:
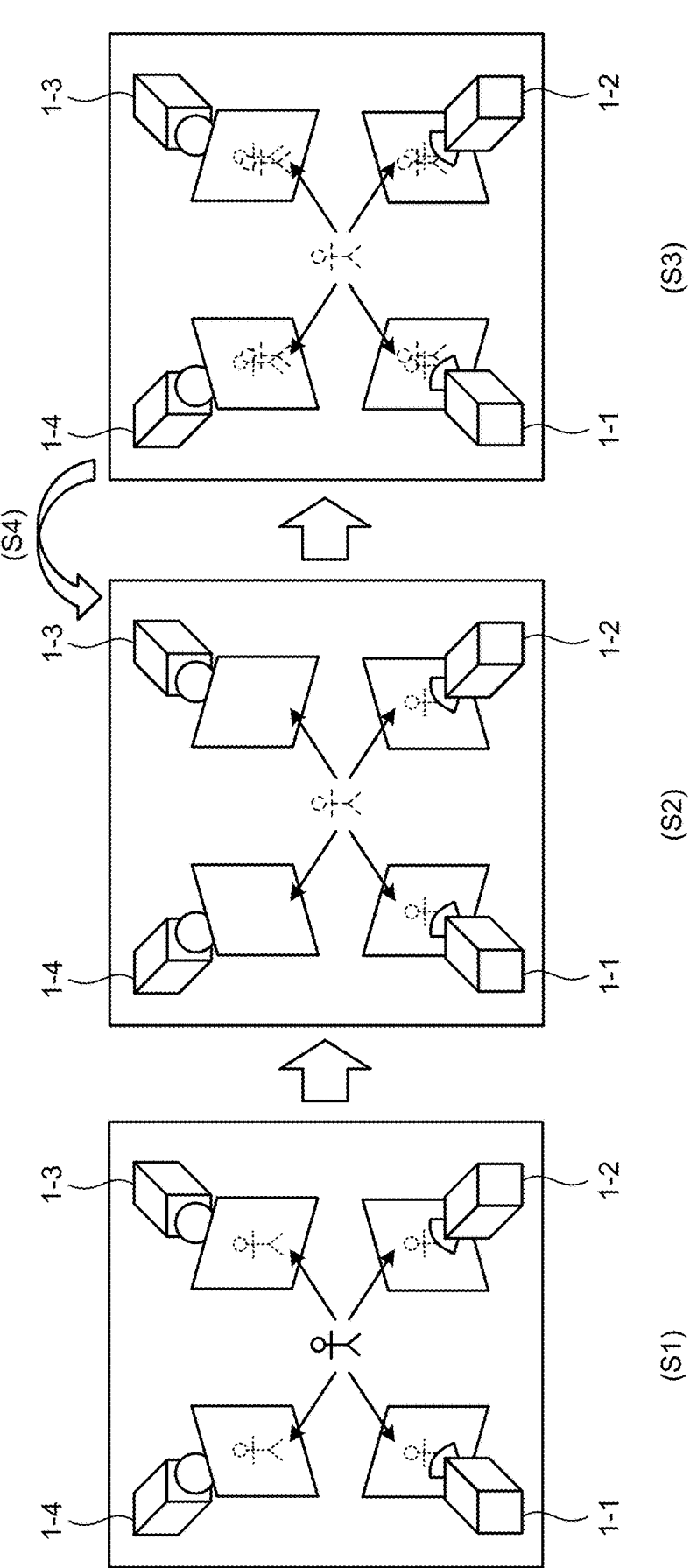
FIG. 24 is a diagram for describing triangulation using three cameras.
Figure 26:
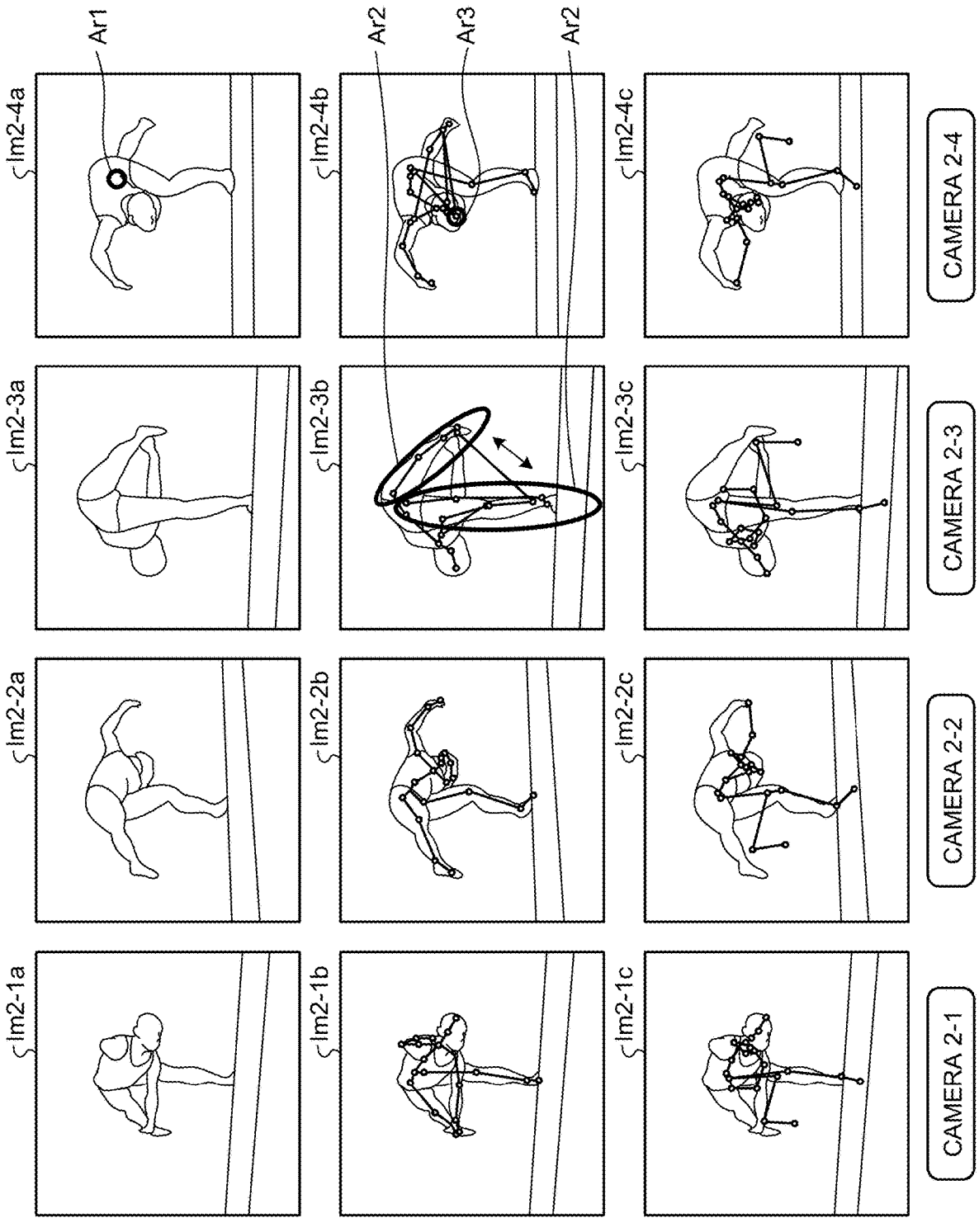
FIG. 26 is a diagram for describing a problem in Conventional Technique 3.

The sensing unit 153 calculates a vector in which a given joint on the left side serves as a start point and a given joint on the right side serves as an end point. For example, in the model M1-1, vectors va1, va2, va3, va4, va5 and va6 are presented. When described using the joints described using FIG. 22, the vector va1 is a vector in which a node 13 serves as a start point and a node 17 serves as an end point. The vector va2 is a vector in which a node 11 serves as a start point and a node 15 serves as an end point. The vector va3 is a vector in which a node 19 serves as a start point and a node 20 serves as an end point. The vector va4 is a vector in which a node 10 serves as a start point and a node 14 serves as an end point. The vector va5 is a vector in which a node 5 serves as a start point and a node 8 serves as an end point. The vector va6 is a vector in which a node 4 serves as a start point and a node 7 serves as an end point.

On the model M1-2, similarly, the sensing unit 153 calculates vectors in which a given joint on the left side serves as a start point and a given joint on the right side serves as an end point. A vector vb3 is presented as an example here.

The sensing unit 153 pairs off vectors having the same start-point joint and the same end-point joint between the model M1-1 and the model M1-2. In the example illustrated in FIG. 8, the vector va3 of the model M1-1 and the vector vb3 of the model M1-2 are paired off. The sensing unit 153 compares norms of the paired vectors and, when the norm decreases by a given value or more from the previous frame (the frame number n−1), senses a corresponding pair of vectors.

For example, the sensing unit 153 senses the vectors va3 and vb3 when the value obtained by subtracting the norm of the vector vb3 from the norm of the vector va3 is a given value or larger. The sensing unit 153 executes the same process on other pairs of vectors. A pair of vectors that is sensed by the sensing unit 153 by this process is referred to as a first sensing vector pair.

The sensing unit 153 compares amounts of shift of the sets of coordinates of joints of a first sensing vector pair and senses a joint with a larger amount of shift as an abnormal joint. For example, when the vector va3 and the vector vb3 are compared, because the amount of shift of the end-point joint is larger than the amount of shift of the start-point joint, the sensing unit 153 senses the end-point joint (Node 20: HAND_TIP_RIGHT) of the model M1-2 as an abnormal joint. Note that the second feature group information on which the model M1-2 is based is second feature group information based on the image frame that is captured by the camera 30a. In this case, the sensing unit 153 generates abnormal joint information containing "Camera identification information: C30a, Frame number: n, and Abnormal joint: HAND_TIP_RIGHT".

Figure 9:
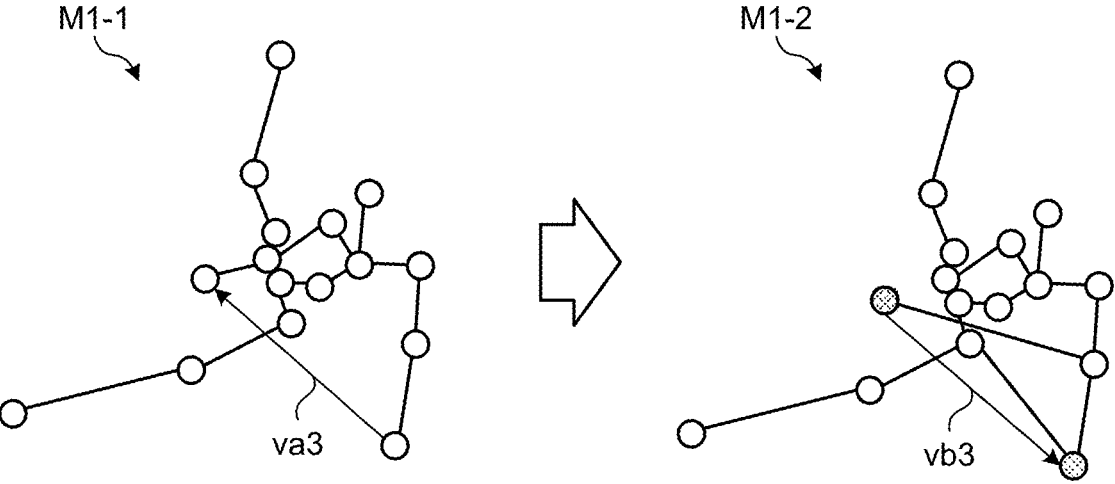
FIG. 9 is Diagram (2) for describing horizontal flip sensing.

FIG. 9 is Diagram (2) for describing horizontal flip sensing. In FIG. 9, a model M1-1 is two-dimensional frame information that is generated based on sets of coordinates of the respective joints of a frame number n−1. A model M1-2 is two-dimensional frame information that is generated based on sets of coordinates of the respective joints of a frame number n. For convenience of description, part of illustration of the joints is omitted in FIG. 9.

As in the case of FIG. 8, the sensing unit 153 calculates a vector in which a given joint on the left side serves as a start point and a given joint on the right side serves as an end point. In FIG. 9, a vector va3 of the model M1-1 and a vector vb3 of the model M1-2 are presented as an example.

The sensing unit 153 pairs off vectors having the same start-point joint and the same end-point joint between the model M1-1 and the model M1-2. The sensing unit 153 calculates an angle formed by the paired vectors. The sensing unit 153 senses a pair of vectors whose formed angle is equal to or larger than a given formed angle.

For example, when the angle formed by the vector va3 and the vector vb3 is equal to or larger than the given formed angle, the sensing unit 153 senses the vectors va3 and vb3. The sensing unit 153 executes the same process on other pairs of vectors. A pair of vectors that is sensed by the sensing unit 153 by this process is referred to as a second sensing vector pair.

The sensing unit 153 senses both a joint serving as a start point and a joint serving as an end point of a second sensing vector pair as abnormal joints. In the example illustrated in FIG. 9, the sensing unit 153 senses a start-point joint (Node 19: HAND_TIP_LEFT) and an end-point joint (Node 20: HAND_TIP_RIGHT) in the model M1-2 as abnormal joints. Note that the second feature group information on which the model M1-2 is based is second feature group information based on the image frame that is captured by the camera 30a. In this case, the sensing unit 153 generates abnormal joint information containing "Camera identification information: C30a, Frame number: n, and Abnormal joint: HAND_TIP_RIGHT and HAND_TIP_LEFT".

The case where the abnormal joint information is generated using the second feature group information of the frame number n−1 and the second feature group information of the frame number n that are generated based on the image frame that is captured by the camera 30a has been described and the same applies to other cameras 30b, 30c and 30d.

Subsequently, self-occlusion sensing that the sensing unit 153 executes will be described. Here, description will be given using second feature group information of frame numbers n−2 and n−1 that is generated based on an image frame captured by the camera 30a.

The sensing unit 153 calculates coordinates of each joint based on J second features contained in the second feature group information of the frame umber n−2. The sensing unit 153 calculates coordinates of each joint based on the J second features that are contained in the second feature group information of the frame number n−1. The process of calculating coordinates of each joint is the same as the process of calculating coordinates of each joint that is described with respect to horizontal flip sensing.

Based on the coordinates of each joint of the frame number n−2 and the coordinates of each joint of the frame number n−1, the sensing unit 153 calculates predicted skeleton information presenting coordinates of each joint of a frame number n. For example, the sensing unit 153 calculates predicted skeleton information representing coordinates of each joint of the frame number n according to Equation (4). In Equation (4), $p_n$ represents predicted coordinates of each joint of the frame number n. $p_n-1$ represents coordinates of each joint of the frame number n−1. $p_n-2$ represents coordinates of each joint of the frame number n−2.

$$p_n = p_{n-1} + (p_{n-1} - p_{n-2}) \qquad (4)$$

Figure 10:
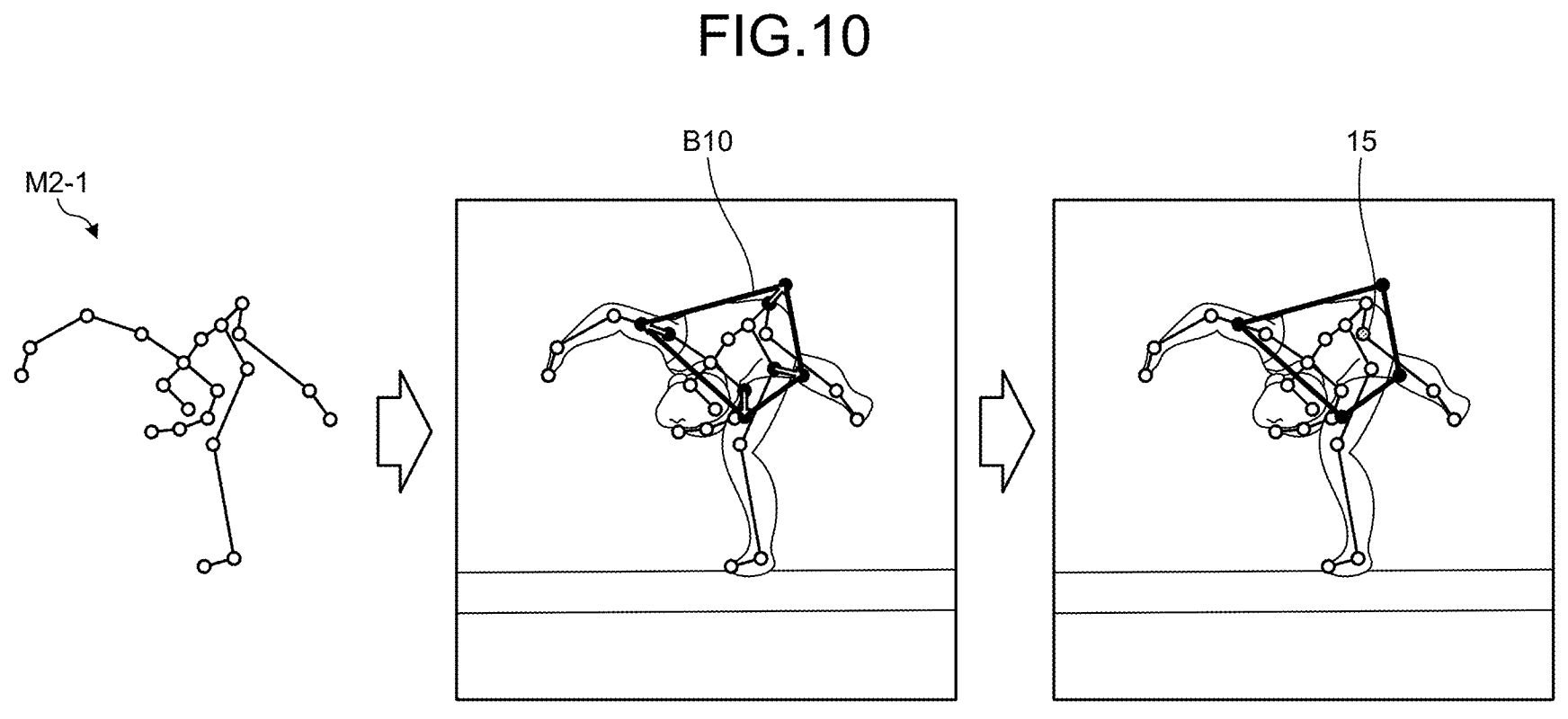

FIG. 10 is a diagram for describing self-occlusion sensing. In FIG. 10, a model M2-1 corresponds to predicted skeleton information representing the sets of coordinates of the respective joints of the frame number n that are predicted according to Equation (4). For convenience of description, part of illustration of the joints is omitted in FIG. 10.

The sensing unit 153 generates a box based on given joints contained in the model M2-1 (predicted skeleton information). For example, when described given using joints described using FIG. 22, with nodes 4, 7, 14 and 10, the box is a box B10. The sensing unit 153 may have a margin in the size of the box B10.

The sensing unit 153 compares coordinates of another joint different from the joints forming the box B10 and the box B10 and, when the coordinates of the joint is contained in the area of the box B10, senses the joint contained in the area of the box B10 as an abnormal joint. For example, other joints are nodes 5 (ELBOW_LEFT), 8 (ELBOW_RIGHT), 6 (WRIST_LEFT), 9 (WRIST_RIGHT), 11 (KNEE_LEFT), 15 (KNEE_RIGHT), 12 (ANKLE_LEFT) and 16 (AN-KLE_RIGHT).

In the example illustrated in FIG. 10, the joint "KNEE_RIGHT" corresponding to the node 15 is contained in the box B10. For this reason, the sensing unit 153 senses the joint (Node 15: KNEE_RIGHT) as an abnormal joint. The coordinates of each joint of the frame number n−2 and the coordinates of each joint of the frame number n−1 that are used to predict the model M2-1 are second feature group information based on the image frame that is captured by the camera 30a. In this case, the sensing unit 153 generates abnormal joint information containing "Camera identification information: C30a, Frame number: n, and Abnormal joint: KNEE_RIGHT".

The case where the abnormal joint information is generated using the second feature group information of the frame number n−2 and the second feature group information of the frame number n−1 that are generated based on the image frame that is captured by the camera 30a has been described and the same applies to other cameras 30b, 30c and 30d.

Figure 11:
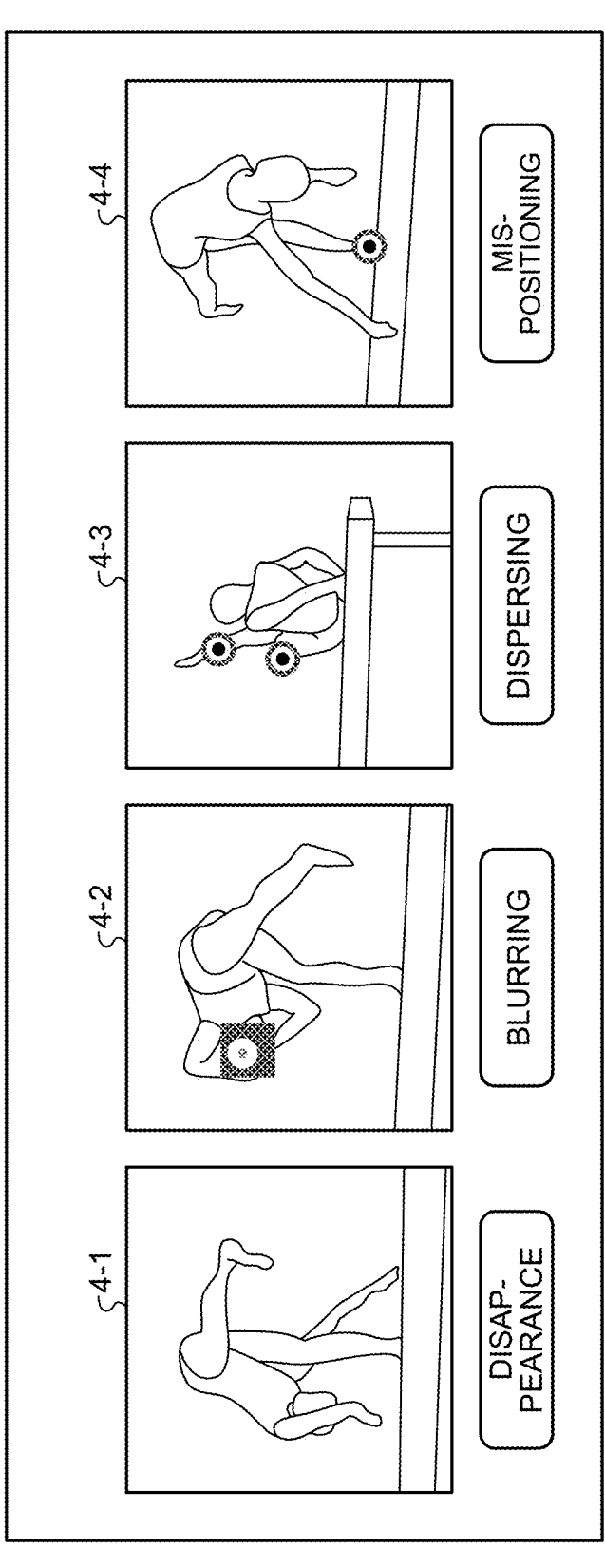
FIG. 11 is a diagram for describing an abnormal heatmap pattern.

Subsequently, the abnormal heatmap sensing that the sensing unit 153 executes will be described. FIG. 11 is a diagram for describing abnormal heatmap patterns. Using FIG. 11, patterns "disappearance", "blurring", "dispersing" and "mispositioning" will be described as an example. Heatmaps 4-1, 4-2, 4-3 and 4-4 correspond to second features.

The pattern "disappearance" is a pattern in which a distribution of high likelihood is not formed as illustrated in the heatmap 4-1. The pattern "blurring" is a pattern in which a distribution of high likelihood spreads in a wide area as illustrated in the heatmap 4-2. The pattern "dispersing" is a pattern in which there are a plurality of peaks of likelihood as illustrated in the heatmap 4-3. The pattern "mispositioning" is a pattern in which the peak of likelihood is in a wrong position as illustrated in the heatmap 4-4.

When the second feature (heatmap) corresponds to any one of the patterns described using FIG. 11, the sensing unit 153 senses a joint corresponding to the second feature as an abnormal joint.

The sensing unit 153 senses second features corresponding to the patterns "disappearance", "blurring" and "dispersing" by first abnormal heatmap sensing processing. The sensing unit 153 senses the pattern "mispositioning" by second abnormal heatmap sensing processing.

The first abnormal heatmap sensing processing that the sensing unit 153 executes will be described. The sensing unit 153 calculates coordinates with the largest value of likelihood from each of the second features contained in the second feature group information of the frame number n. The coordinates with the largest likelihood is referred to as "largest-value coordinates". For example, as described using FIG. 6, because J second features are contained in each set of camera identification information, when there are four cameras and the number of joints is "21", 84 sets of largest-value coordinates are calculated from 84 second features. In the following description, the sets of second feature group information (second features <heatmap>) corresponding to the cameras 30a to 30d are collectively referred to as "$HM_{input}$".

Based on each of the sets of largest-value coordinates of $HM_{input}$, the sensing unit 153 generates second features of $HM_{input}$ the same form as that in training of the 2D feature extraction NN 142A and the number-of-channels conversion NN 142B for the second features contained in "$HM_{input}$". The generated second features are referred to as "$HM_{eval}$".

Figure 12:
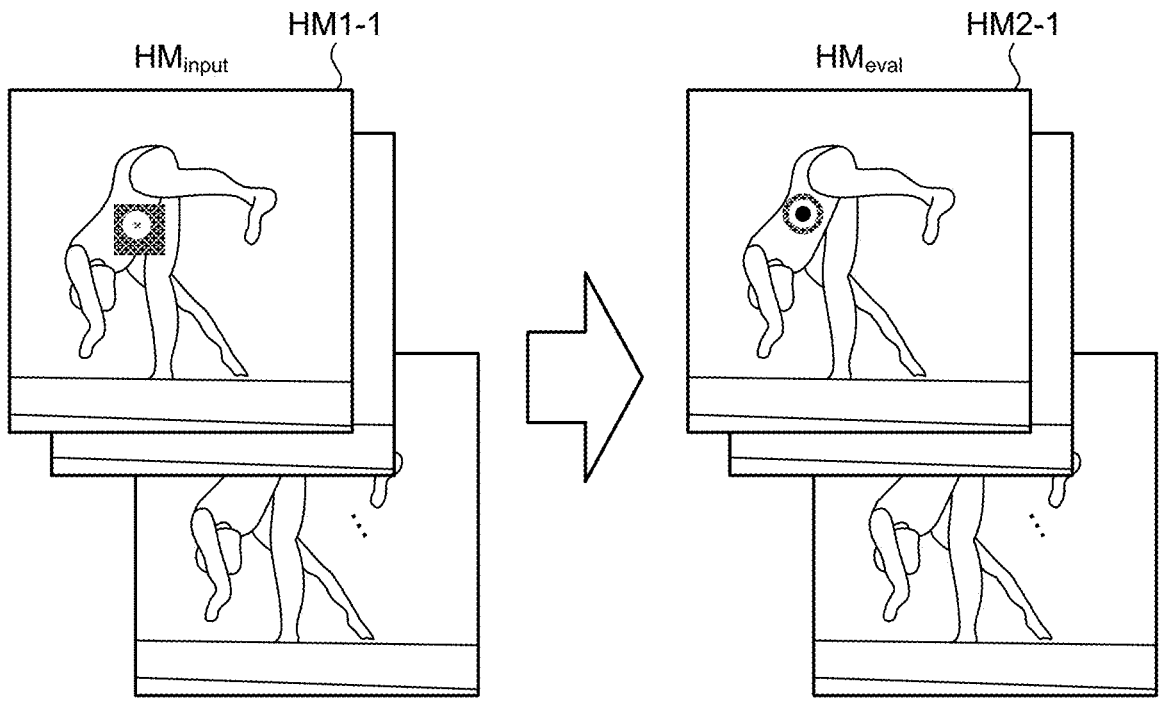
FIG. 12 is a diagram for describing first abnormal heatmap sensing processing.

FIG. 12 is Diagram (1) for describing the first abnormal heatmap sensing processing. FIG. 12 illustrates a case where $HM_{eval}$ is generated from $HM_{input}$. According to 2D Gaussian, the sensing unit 153 calculates a standard deviation based on the value of likelihood of training data and sets an average value for the largest coordinates. For example, when generating a second feature HM2-1 of $HM_{eval}$ from a second feature HM1-1 of $HM_{input}$, the sensing unit 153 performs the following calculation. According to the standard deviation based on the likelihood of the heatmap that is used to train the 2D feature extraction NN 142A and the number-of-channels conversion NN 142B and a Gaussian distribution in which the largest-value coordinates of the second feature HM1-1 is the average value, the sensing unit 153 generates a second feature HM2-1 of $HM_{eval}$.

The sensing unit 153 calculates a difference in each corresponding feature between $HM_{input}$ and $HM_{eval}$ and senses a joint corresponding to a second feature on which the difference is at or above a threshold as an abnormal joint.

The sensing unit 153 calculates, as the difference, a mean squared error (MSE) presented by Equation (5) or a mean absolute error (MAE) presented by Equation (6). "$x_i^{input}$" presented in Equation (5) is a pixel value (likelihood) of a second feature of $HM_{input}$. "$x_i^{eval}$" presented in Equation (5) is a pixel value (likelihood) of a second feature of $HM_{eval}$.

$$MSE = \frac{\sum_{i=1}^{N}\left(x_i^{input} - x_i^{eval}\right)^2}{N} \qquad (5)$$

$$MAE = \frac{\sum_{i=1}^{N}\left|x_i^{input} - x_i^{eval}\right|}{N} \qquad (6)$$

For example, the sensing unit 153 calculates a difference based on each pixel value of the second feature HM1-1 illustrated in FIG. 12 and each pixel value of the second feature HM2-1 and, when the difference is at or above the threshold, senses an abnormality in the joint corresponding to the second feature HM1-1. When the second feature HM1-1 is a second feature of the frame number n contained in the second feature group information corresponding to the camera 30*a* and is a second feature corresponding to the joint "HAND_TIP_RIGHT", abnormal joint information containing "Camera identification information: C30*a*, Frame number: n, and Abnormal joint: HAND_TIP_RIGHT" is generated.

Figure 13:
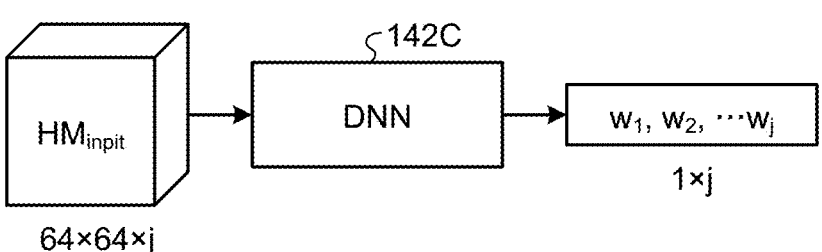
FIG. 13 is a diagram for describing an example of automatic weighting adjustment on a network.

The sensing unit 153 may perform automatic weighting adjustment to reduce the effect of an abnormal second feature. FIG. 13 is a diagram for describing an example of automatic weighting adjustment on a network. A DNN (Deep Neural Network) 142C illustrated in FIG. 13 is a network consisting of a 2D convolutional layer, a ReLU layer, a MaxPooling layer, and a fully connected layer. The DNN 142C is not trained independently of the whole model but is trained simultaneously with the whole model by embedded self-learning system.

For example, $HW_{input}$ containing j second features is input to the DNN 142C and accordingly weights $w_1$, $w_2$, . . . $w_j$ corresponding to the respective second features are output. For example, the sensing unit 153 generates each of the weights $w_1$, $w_2$, . . . $w_j$ as abnormal joint information. When the weight of the weight $w_1$ is small (under a threshold), it can be determined that the joint with the second feature corresponding to the weight $w_1$ is abnormal.

Subsequently, the second abnormal heatmap sensing processing that the sensing unit 153 executes will be described. The sensing unit 153 senses an abnormal joint based on multi-view geometric consistency. For example, the sensing unit 153 executes the following processing.

The sensing unit 153 calculates largest-value coordinates from the J second features contained in the second feature group information of the frame number n. Largest-value coordinates are coordinates with the largest likelihood. The sensing unit 153 executes the following processing on the second feature contained in the second feature group information of a viewpoint v. The viewpoint v corresponds to center coordinates of the single camera 30.

Figure 14:
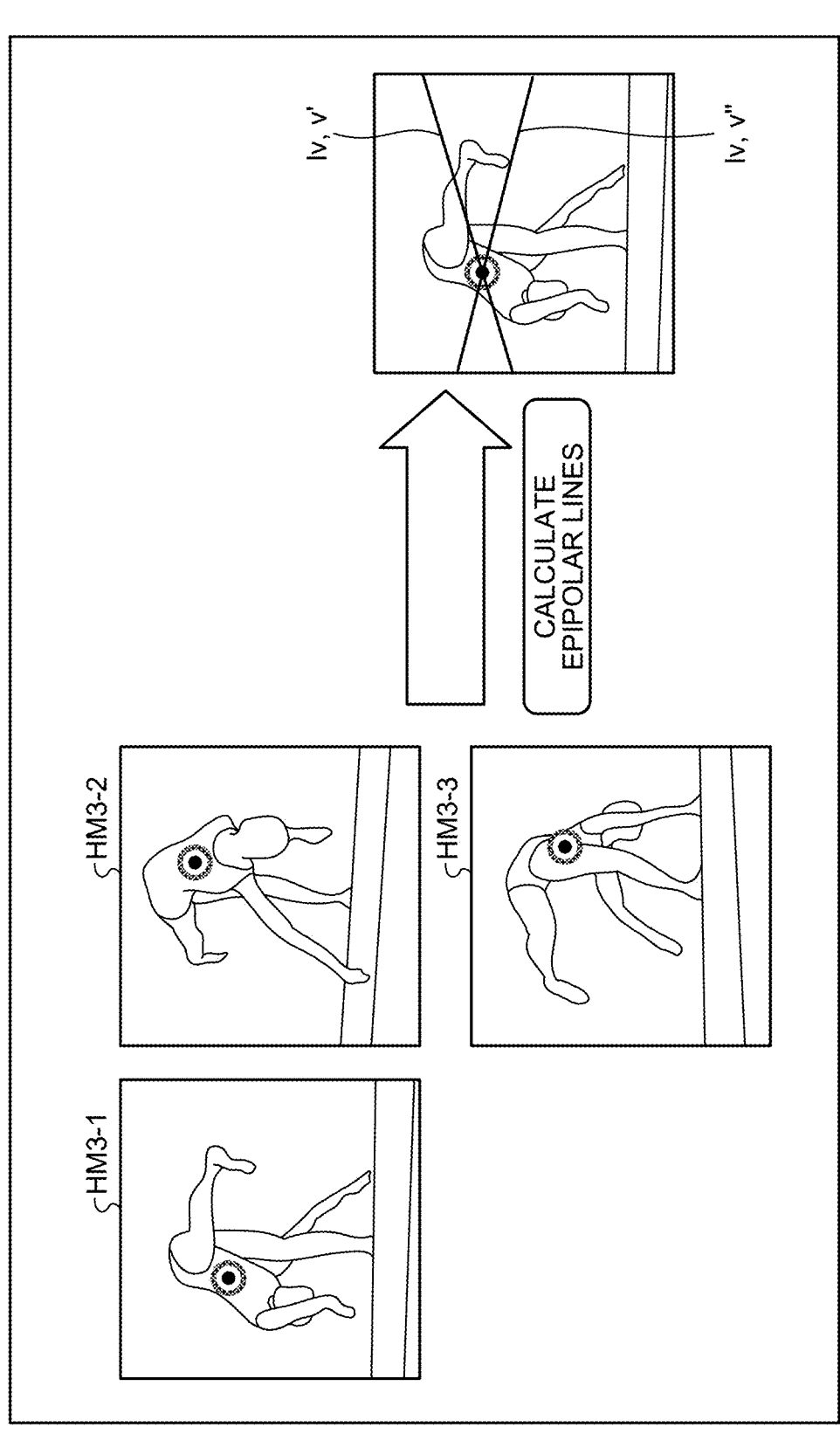
FIG. 14 is Diagram (1) for describing second abnormal heatmap sensing processing.

FIG. 14 is Diagram (1) for describing the second abnormal heatmap sensing processing. A second feature HM3-1 serves as a second feature of the viewpoint v of interest. A second feature HM3-2 serves as a second feature of another viewpoint v'. A second feature HM3-3 serves as a second feature of another viewpoint v''. The sensing unit 153 calculates an epipolar line $l_{v,v'}$ based on largest-value coordinates of the second feature HM3-1 and largest-value coordinates of the second feature HM3-2. The sensing unit 153 calculates an epipolar line $l_{v,v''}$ based on the largest-value coordinates of the second feature HM3-1 and largest-value coordinates of the second feature HM3-3.

The sensing unit 153 calculates an intersection of the epipolar line $l_{v,v'}$ and the epipolar line $l_{v,v''}$. The sensing unit 153 calculates a Euclidean distance d between the largest-value coordinates of the second feature HM3-1 of the viewpoint v of interest and the intersection. The sensing unit 153 repeatedly executes the above-described processing per viewpoint and extracts a combination of viewpoints with which the Euclidean distance d is at or under a threshold $d_{th}$.

FIG. 15 is Diagram (2) for describing the second abnormal heatmap sensing processing. In FIG. 15, a viewpoint (camera) of interest and a viewpoint combination are associated with each other. The viewpoint of interest corresponds to the viewpoint of interest in FIG. 14. The viewpoint combination represents a combination of viewpoints that generates an intersection and with which a Euclidean distance d between the largest-value coordinates of the viewpoint of interest and the intersection is at or under the threshold $d_{th}$.

For convenience of description, the viewpoint corresponding to the center coordinates of the camera 30*a* is v30*a*. The viewpoint corresponding to the center coordinates of the camera 30*b* is v30*b*. The viewpoint corresponding to the center coordinates of the camera 30*c* is v30*c*. The viewpoint corresponding to the center coordinates of the camera 30*d* is v30*d*.

A first row in FIG. 15 presents that a Euclidean distance d between largest-value coordinates of the viewpoint of interest v30*a* and an intersection of first and second epipolar lines is at or under the threshold $d_{th}$. The first epipolar line is an epipolar line between the viewpoint of interest v30*a* and the viewpoint of interest v30*c*. The second epipolar line is an epipolar line between the viewpoint of interest v30*a* and the viewpoint of interest v30*d*.

A second row in FIG. 15 presents that there is no intersection of epipolar lines with which a Euclidean distance d from largest-value coordinates of the viewpoint of interest v30*b* is at or under the threshold.

A third row in FIG. 15 presents that a Euclidean distance d between largest-value coordinates of the viewpoint of interest v30*c* and an intersection of third and fourth epipolar lines is at or under the threshold $d_{th}$. The third epipolar line is an epipolar line between the viewpoint of interest v30*c* and the viewpoint of interest v30*a*. The fourth epipolar line is an epipolar line between the viewpoint of interest v30*c* and the viewpoint of interest v30*a*.

A fourth row in FIG. 15 presents that a Euclidean distance d between largest-value coordinates of the viewpoint of interest v30*d* and an intersection of fifth and sixth epipolar lines is at or under the threshold $d_{th}$. The fifth epipolar line is an epipolar line between the viewpoint of interest v30*d* and the viewpoint of interest v30*a*. The sixth epipolar line is an epipolar line between the viewpoint of interest v30*d* and the viewpoint of interest v30*c*.

The sensing unit 153 senses, as an abnormal joint, a joint corresponding to a second feature corresponding to a viewpoint of interest without any combination with a viewpoint that is most contained in combinations.

In the example illustrated in FIG. 5, the viewpoint most contained in combinations is the viewpoint v30*a*. The viewpoint without any combination with the viewpoint is the viewpoint v30*b*. For this reason, the sensing unit 153 senses, as an abnormal joint, a joint with a second feature corresponding to the viewpoint v30*b*. For example, when the joint corresponding to the second feature corresponding to the viewpoint v30b is "HAND_TIP_RIGHT" and corresponds to the frame number n. In this case, the sensing unit 153 generates abnormal joint information containing "Camera identification information: C30b, Frame number: n, and Abnormal joint: HAND_TIP_RIGHT".

An example of calculating an epipolar line will be described here. When camera center coordinates of viewpoints v and v' are $C_v$ and $C_{v'}$, perspective projection matrices are $P_v$ and $P_{v'}$, and largest-value coordinates of the viewpoint v' is $p_{v'}$, the sensing unit 153 calculates an epipolar line $l_{v,v'}$ at $p_{j,v'}$ in the viewpoint v by Equation (7). In Equation (7), $(\cdot)_x$ represents a skew asymmetric matrix. $P_{v'}^+$ represents a pseudo-inverse matrix $(P_{v'}^T(P_{v'}P_{v'}^T)^{-1})$ of $P_{v'}$.

$$l_{v,v'} = [P_vC_{v'}]_x P_v P_v^+ P_{v'} \tag{7}$$

An intersection of epipolar lines will be described. An intersection $q_{v,v',v''}$ of epipolar lines $l_{v,v'}$ and $l_{v,v''}$ drawn from largest-value coordinates of viewpoints v' and v'' in a viewpoint v are derived. As in the case of deriving of an intersection of two straight lines, when $l_{v,v'}=(a_{v'},b_{v'},-c_{v'})$ and $l_{v,v''}=(a_{v''},b_{v''},-c_{v''})$, the sensing unit 153 makes a calculation based on Equation (8). $A^{-1}$ in Equation (8) is presented by Equation (9). C in Equation (8) is presented by Equation (10).

$$q_{v,v',v''} = A^{-1}C \tag{8}$$

$$A = \begin{pmatrix} a_{v'} & b_{v'} \\ a_{v''} & b_{v''} \end{pmatrix} \tag{9}$$

$$C = \begin{pmatrix} -c_{v'} \\ -c_{v''} \end{pmatrix} \tag{10}$$

The sensing unit 153 calculates a distance d between maximum coordinates $p_{j,v}$ and the intersection between epipolar lines according to Equation (11).

$$d = |p_{j,v} - q_{v,v',v''}| \tag{11}$$

As described above, the sensing unit 153 executes horizontal flip sensing, self-occlusion sensing, abnormal heatmap sensing and generates abnormal joint information. As for the sensing unit 153, as described above, the abnormal joint information includes camera identification information, a frame number, and an abnormal joint. The sensing unit 153 outputs the abnormal joint information to the skeleton recognition unit 154.

Back to description of FIG. 4. The skeleton recognition unit 154 acquires the second feature group information of each set of camera identification information from the feature table 142 and removes second features corresponding to the abnormal joint information from the second features contained in the acquired second feature group information. Based on a result of integrating the remaining second features after removal of the second features corresponding to the abnormal joint information, the skeleton recognition unit 154 recognizes a 3D skeleton. The skeleton recognition unit 154 repeatedly executes the above-described process with respect to every frame number and outputs the result of recognizing the 3D skeleton to the element recognition unit 155.

A specific example of a process by the skeleton recognition unit 154 is presented here. The skeleton recognition unit 154 calculates aggregated volumes by performing back projection of sets of second feature group information (J second features) corresponding to each camera onto a 3D cube according to the camera parameters. The frame number of the second feature information is n here and the same applies to the process on second feature group information corresponding to another frame number.

For example, by performing back projection of second feature group information corresponding to the camera identification information "C30a" onto a 3D cube according to camera parameters of the camera 30a, the skeleton recognition unit 154 calculates a first aggregated volume. By performing back projection of the second feature group information corresponding to the camera identification information "C30b" onto the 3D cube according to camera parameters of the camera 30b, the skeleton recognition unit 154 calculates a second aggregated volume.

By performing back projection of second feature group information corresponding to the camera identification information "C30c" onto the 3D cube according to camera parameters of the camera 30c, the skeleton recognition unit 154 calculates a third aggregated volume. By performing back projection of the second feature group information corresponding to the camera identification information "C30d" onto the 3D cube according to camera parameters of the camera 30d, the skeleton recognition unit 154 calculates a fourth aggregated volume.

The skeleton recognition unit 154 specifies an abnormal aspect obtained by performing back projection of the second feature corresponding to the abnormal joint information onto the 3D cube and executes filtering for removing the abnormal aspect from the first, second, third and fourth aggregated volume (volumes).

For example, the skeleton recognition unit 154 executes filtering using the camera identification information (the camera c seeing abnormality) contained in the abnormal joint information, an abnormal joint k, and Equation (12). c contained in Equation (12) is an invalid value that invalidates the effect of softmax.

$$V_{c_a k_a}^{view} = c \tag{12}$$

The skeleton recognition unit 154 calculates input information to a V2V (neural network) by integrating the first, second, third, and fourth aggregated volume (volumes) from which the abnormal aspects have been removed (having been filtered).

The skeleton recognition unit 154 executes an integrating process based on Equation (13) or Equation (14) and Equation (15) and calculates input information $V^{input}$.

When the integrating process is performed based on Equations (13), (14) and (15), a restriction may be set such that only the opposing cameras do not remain in order to ensure accuracy of a 3D skeleton.

$$V_k^{input} = \sum_c (d_c \cdot V_{c,k}^{view}) / \sum_c d_c \tag{13}$$

-continued $$V_{c,k}^{\omega} = \exp(V_{c,k}^{view})/\sum_{c}\exp(V_{c,k}^{view}) \tag{14}$$

$$V_{k}^{input} = \sum_{c}V_{c,k}^{\omega} \circ V_{c}^{view} \tag{15}$$

By inputting the input information to the V2V, the skeleton recognition unit 154 calculates processed volumes representing 3D positional coordinates of each joint. The skeleton recognition unit 154 generates a result of recognizing a 3D skeleton by executing soft-argmax on the processed volumes. The result of recognizing a 3D skeleton contains 3D coordinates of the J joints. The skeleton recognition unit 154 outputs skeleton recognizing result data serving as the result of recognizing a 3D skeleton to the element recognition unit 155. The skeleton recognition unit 154 saves the skeleton recognizing result data in the storage unit 140.

The element recognition unit 155 acquires sets of frame recognizing result data in the order of frame numbers from the skeleton recognition unit 154 and, based on the successive sets of skeleton recognizing result data, specifies changes in coordinates of each joint in time series. The element recognition unit 155 compares the changes in the position of each joint in time series and the element recognition table 143 and specifies a type of element. The element recognition unit 155 further compares a combination of types of element and the element recognition table 143 and calculates a score of the performance of the subject H1.

The element recognition unit 155 generates screen information based on the score of the performance and the skeleton recognizing result data from the start to the end of the performance. The element recognition unit 155 outputs the generated screen information to the display unit 130 and causes the display unit 130 to display the screen information.

FIG. 16 is a diagram illustrating an example of the screen information. As illustrated in FIG. 16, areas 60a, 60b and 60c are contained in screen information 60. The area 60a is an area in which types of element that are recognized in the performance that the subject H1 did are displayed. In addition to the types of element, difficulty of element may be displayed. The area 60b is an area in which a score of the performance is displayed. The area 60c is an area on which a three-dimensional model based on the skeleton recognizing result data from the start to the end of the performance is displayed in animation. The user operates the input unit 120 to make an instruction to play or stop an animation, etc.

Figure 17:
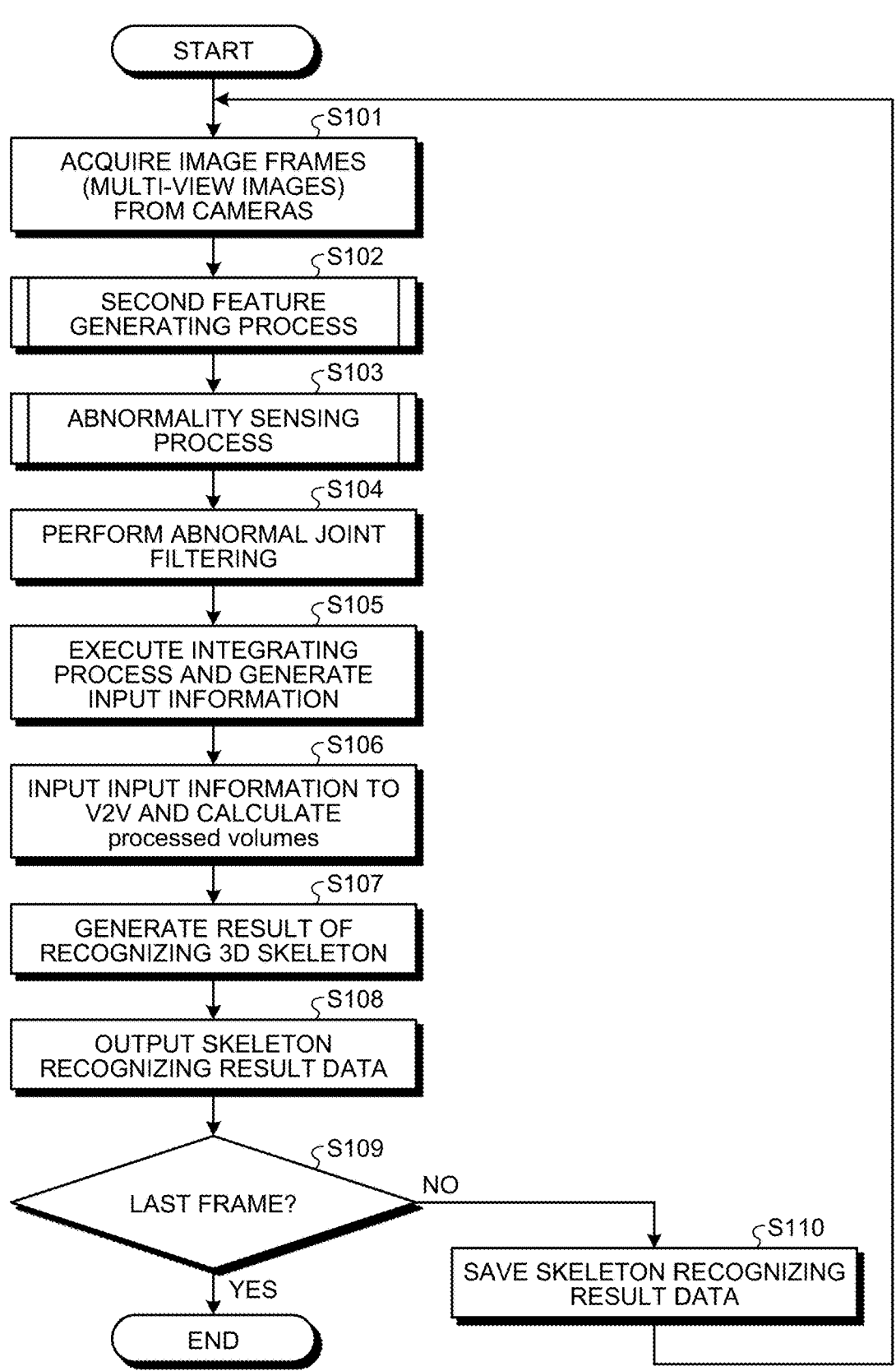
FIG. 17 is a flowchart illustrating a procedure of a process by the skeleton recognition apparatus according to the embodiment.

An example of a procedure of a process by the skeleton recognition apparatus 100 according to the embodiment will be described next. FIG. 17 is a flowchart illustrating the procedure of the process by the skeleton recognition apparatus according to the embodiment. The acquisition unit 151 of the skeleton recognition apparatus 100 acquires image frames (multi-view images) from the cameras 30 (step S101).

The generation unit 152 of the skeleton recognition apparatus 100 executes a second feature generating process (step S102). The sensing unit 153 of the skeleton recognition apparatus 100 executes an abnormality sensing process (step S103).

The skeleton recognition unit 154 of the skeleton recognition apparatus 100 executes abnormal joint filtering (step S104). The skeleton recognition unit 154 executes the integrating process and generates input information (step S105).

The skeleton recognition unit 154 inputs the input information to the V2V and calculates processed volumes (step S106).

The skeleton recognition unit 154 executes soft-argmax on the processed volumes, thereby generating a result of recognizing a 3D skeleton (step S107). The skeleton recognition unit 154 outputs skeleton recognizing result data to the element recognition unit 155 (step S108).

When it is the last frame (YES at step S109), the skeleton recognition unit 154 ends the process. On the other hand, when it is not the last frame (NO at step S109), the skeleton recognition unit 154 saves skeleton recognizing result data in the storage unit 140 (step S110) and moves to step S101.

An example of the second feature generating process described with respect to step S102 in FIG. 17 will be described next. FIG. 18 is a flowchart of the second feature generating process. As illustrated in FIG. 18, the generation unit 152 of the skeleton recognition apparatus 100 inputs an image frame to the 2D feature extraction NN 142A, thereby calculating K first features (step S201).

The generation unit 152 inputs the K first features to the number-of-channels conversion NN 142B, thereby generating J second features (step S202). The generation unit 152 outputs information of the second features (step S203).

An example of the abnormality sensing process described with respect to step S103 in FIG. 17 will be described next. FIG. 19 is a flowchart of the abnormality sensing process. As illustrated in FIG. 19, the sensing unit 153 of the skeleton recognition apparatus 100 acquires a second feature (step S301). The sensing unit 153 executes horizontal flip sensing (step S302).

The sensing unit 153 executes occlusion sensing (step S303). The sensing unit 153 executes abnormal heatmap sensing (step S304). The sensing unit 153 generates abnormal joint information based on an abnormal joint sensing result (step S305). The sensing unit 153 outputs the abnormal joint information (step S306).

An effect of the skeleton recognition apparatus 100 according to the embodiment will be described. The skeleton recognition apparatus 100 generates K first features representing features of two-dimensional joint positions of a subject H1 that are extracted from an image frame that is input from the camera 30 and J second features (second feature information) corresponding to J joints of the subject. The skeleton recognition apparatus 100 senses a second feature corresponding to an abnormal joint from second feature group information and, from the second feature group information, recognizes a 3D skeleton based on a result of integrating remaining second features obtained by removing abnormal second features from the second feature group information. This makes it possible to previously remove the abnormal 2D feature and execute 3D skeleton recognition correctly.

The skeleton recognition apparatus 100 senses an abnormal second feature based on a vector that is generated based on previous second feature group information (of a frame number n−1) and a vector that is generated based on current second feature group information (of a frame number n). Accordingly, it is possible to sense an abnormal joint that horizontally flips.

The skeleton recognition apparatus 100 senses an abnormal feature based on a relationship between a Box that is specified from given joints based on the second feature group information and positions of joints other than the given joints. Accordingly, it is possible to sense an abnormal joint that is affected by occlusion.

The skeleton recognition apparatus 100 senses an abnormal second feature based on a difference between a heatmap (second feature) and information of an ideal distribution of likelihood that is specified previously. The skeleton recognition apparatus 100 calculates a plurality of epipolar lines using camera positions as viewpoints based on a heatmap and senses an abnormal second feature based on a distance between the intersection of the epipolar lines and the position of the joint. This makes it possible to sense second features causing the patterns "disappearance", "blurring", "dispersing" and "mispositioning" and remove the second features.

Figure 20:
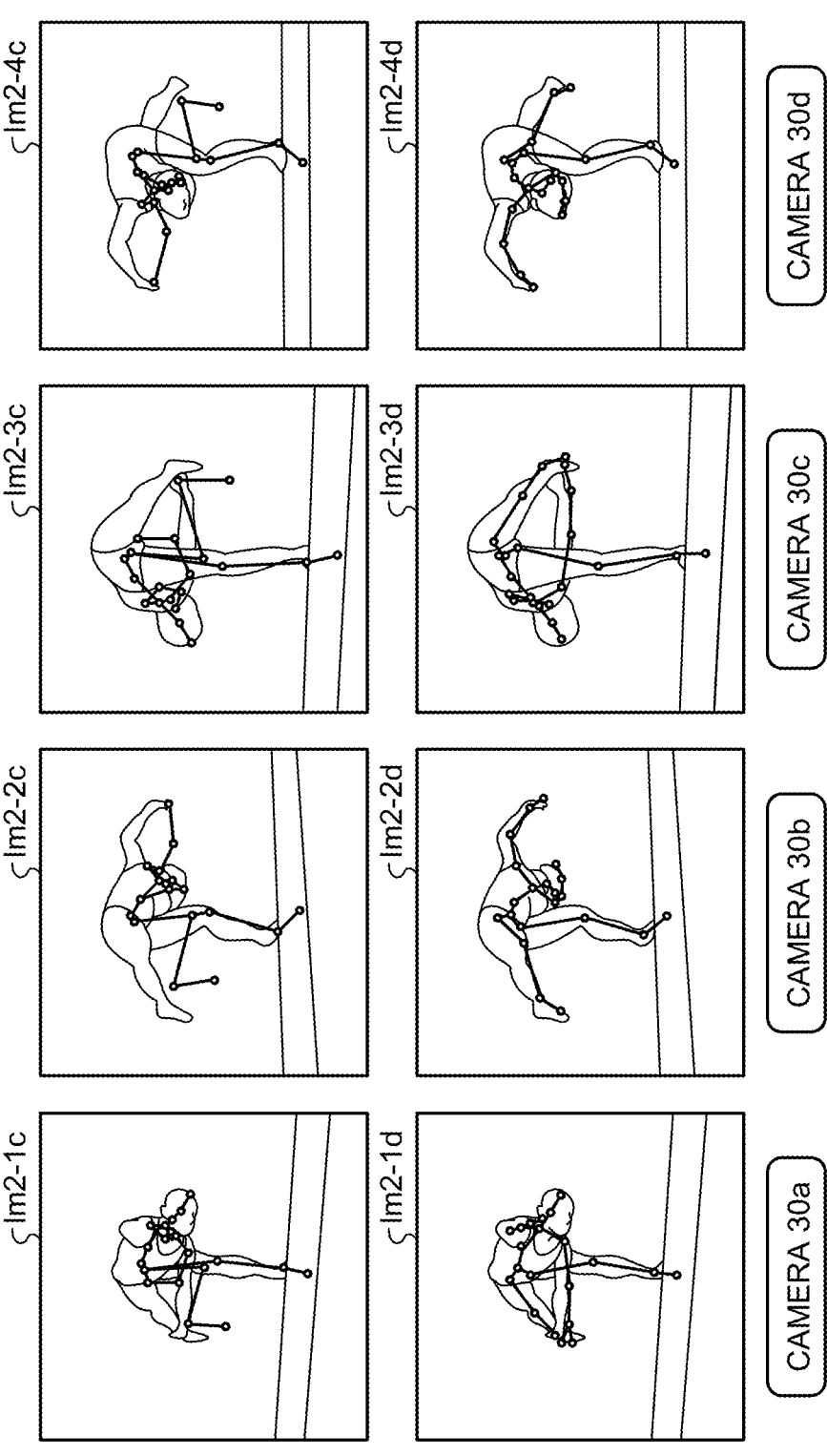
FIG. 20 is a diagram for describing an effect of the skeleton recognition apparatus according to the embodiment.

FIG. 20 is a diagram for describing an effect of the skeleton recognition apparatus according to the embodiment. FIG. 20 illustrates 3D skeleton recognizing results Im2-1*c*, Im2-2*c*, Im2-3*c* and Im2-4*c* of a conventional technique and 3D skeleton recognizing results Im2-1*d*, Im2-2*d*, Im2-3*d* and Im2-4*d* obtained by the skeleton recognition apparatus 100. According to the skeleton recognition apparatus 100, accuracy of 3D skeletons is improved by removing second features corresponding to incorrect joints by horizontal flip sensing, self-occlusion sensing and abnormal heatmap sensing. For example, while the subject and the 3D skeleton misfit in the 3D skeleton recognizing results Im2-1*c* to Im2-4*c* of the conventional technique, the 3D skeleton of the subject is properly specified in the 3D skeleton recognizing results Im2-1*d* to Im2-4*d* of the embodiment.

Figure 21:
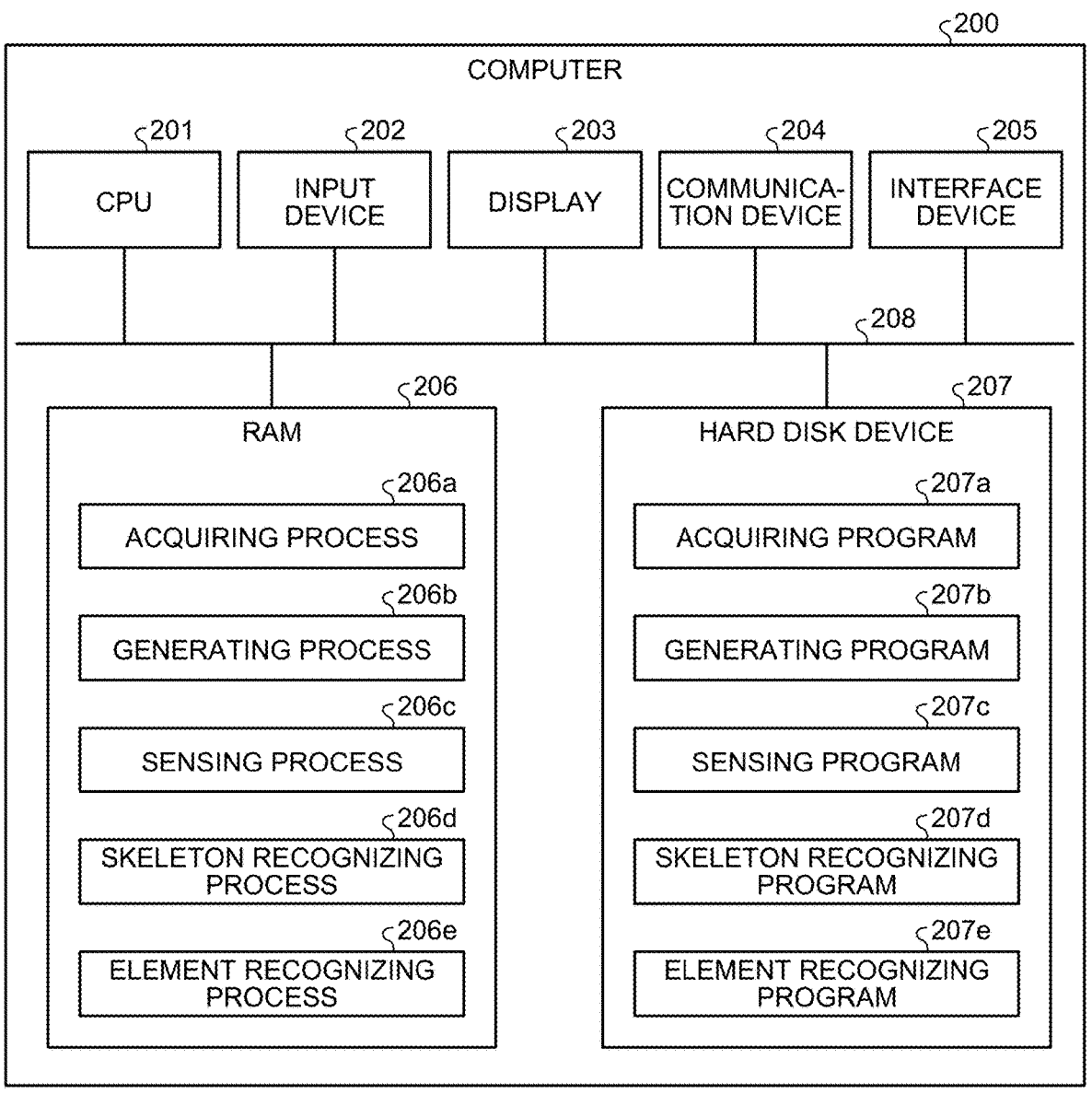
FIG. 21 is a diagram illustrating an example of a hardware configuration of a computer that realizes the same function as that of the skeleton recognition apparatus.

An example of a hardware configuration of a computer that realizes the same functions as those of the skeleton recognition apparatus 100 presented in the above-described embodiment will be described next. FIG. 21 is a diagram illustrating an example of a hardware configuration of a computer that realizes the same functions as those of the skeleton recognition apparatus.

As illustrated in FIG. 21, a computer 200 includes a CPU 201 that executes various types of computing, an input device 202 that receives inputs of data from a user, and a display 203. The computer 200 further includes a communication device 204 that receives data of a distance image from the camera 30 and an interface device 205 that is connected to various types of devices. The computer 200 includes a RAM 206 that temporarily stores various types of information and a hard disk device 207. Each of the devices 201 to 207 is connected to a bus 208.

A hard disk device 207 includes an acquiring program 207*a*, a generating program 207*b*, a sensing program 207*c*, a skeleton recognizing program 207*d*, and an element recognizing program 207*e*. The CPU 201 reads the acquiring program 207*a*, the generating program 207*b*, the sensing program 207*c*, the skeleton recognizing program 207*d*, and the element recognizing program 207*e* and loads the programs into the RAM 206.

The acquiring program 207*a* functions as an acquiring process 206*a*. The generating program 207*b* functions as a generating process 206*b*. The sensing program 207*c* functions as a sensing process 206*c*. The skeleton recognizing program 207*d* functions as a skeleton recognizing process 206*d*. The element recognizing program 207*e* functions as an element recognizing process 206*e*.

The process of the acquiring process 206*a* corresponds to a process by the acquisition unit 151. The process of the generating process 206*b* corresponds to a process by the generation unit 152. The process of the sensing process 206*c* corresponds to a process by the sensing unit 153. The process by the skeleton recognizing process 206*d* corresponds to the process by the skeleton recognition unit 154.

The process by the element recognizing process 206*e* corresponds to the process by the element recognition unit 155.

Each of the programs 207*a* to 207*e* are not necessarily stored in the hard disk device 207 from the beginning. For example, each of the programs may be stored in a "portable physical medium", such as a flexible disc, a CD-ROM, a DVD disc, a magneto-optical disk, or an IC card that is inserted into the computer 200. The computer 200 may read and execute each of the programs 207*a* to 207*e*.

Determining 2D features that deliver abnormality to a 3D skeleton recognizing result makes it possible to remove abnormal 2D features previously and execute 3D skeleton recognition correctly.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A skeleton recognition method comprising:
    extracting a plurality of first features presenting features of two-dimensional joint positions of a subject, based on two-dimensional input images that are input from a plurality of cameras that capture images of the subject;
    generating, based on the first features, second feature group information containing a plurality of second features corresponding to a given number of joints of the subject, respectively;
    sensing an abnormal second feature from the second feature group information; and
    recognizing a 3D skeleton based on a result of integrating the second features that remain after removal of the abnormal second feature from the second feature group information, by using a processor,
    wherein the second feature is coordinates and heatmap information in which likelihood of presence of a given joint is associated with the coordinates, and
    the sensing senses an abnormal feature based on a difference between the heatmap information and information of Gaussian distribution of likelihood that is specified previously.

2. The skeleton recognition method according to claim 1, wherein the generating generates a plurality of sets of second feature group information in time series, and
    the sensing senses an abnormal second feature based on a first vector in which a given pair of joints that are specified based on previous second feature group information serves as a start point and an end point and a second vector in which a given pair of joints that are specified based on current second feature group information serves as a start point and an end point.

3. The skeleton recognition method according to claim 2, wherein the sensing senses an abnormal second feature based on a relationship between an area that is specified from a given joint based on the second feature group information and positions of joints other than the given joint.

4. The skeleton recognition method according to claim 1, wherein the sensing calculates a plurality of epipolar lines using camera positions as viewpoints based on the heatmap information and sensing an abnormal second feature based on a distance between an intersection of the epipolar lines and a position of a joint.

5. A non-transitory computer-readable recording medium having stored therein a skeleton recognition program that causes a computer to execute a process comprising:

extracting a plurality of first features presenting features of two-dimensional joint positions of a subject, based on two-dimensional input images that are input from a plurality of cameras that capture images of a subject;

generating, based on the first features, second feature group information containing a plurality of second features corresponding to a given number of joints of the subject, respectively;

sensing an abnormal second feature from the second feature group information; and recognizing a 3D skeleton based on a result of integrating the second features that remain after removal of the abnormal second feature from the second feature group information, wherein the second feature is coordinates and heatmap information in which likelihood of presence of a given joint is associated with the coordinates, and the sensing senses an abnormal feature based on a difference between the heatmap information and information of Gaussian distribution of likelihood that is specified previously.

6. The non-transitory computer-readable recording medium according to claim 5, wherein the generating generates a plurality of sets of second feature group information in time series, and the sensing senses an abnormal second feature based on a first vector in which a given pair of joints that are specified based on previous second feature group information serves as a start point and an end point and a second vector in which a given pair of joints that are specified based on current second feature group information serves as a start point and an end point.

7. The non-transitory computer-readable recording medium according to claim 6, wherein the sensing senses an abnormal second feature based on a relationship between an area that is specified from a given joint based on the second feature group information and positions of joints other than the given joint.

8. The non-transitory computer-readable recording medium according to claim 5, wherein the sensing calculates a plurality of epipolar lines using camera positions as viewpoints based on the heatmap information and sensing an abnormal second feature based on a distance between an intersection of the epipolar lines and a position of a joint.

9. A gymnastics scoring assist system including a plurality of cameras that capture images of a subject and a skeleton recognition apparatus comprising:

a processor configured to:

acquire two-dimensional input images that are input from the cameras;

extract a plurality of first features presenting features of two-dimensional joint positions of the subject based on the input images generate, based on the first features, second feature group information containing a plurality of second features corresponding to a given number of joints of the subject, respectively;

sense an abnormal second feature from the second feature group information; and recognize a 3D skeleton based on a result of synthesizing second features that remain after removal of the abnormal second feature from the second feature group information, wherein the second feature is coordinates and heatmap information in which likelihood of presence of a given joint is associated with the coordinates and the processor is further configured to sense an abnormal feature based on a difference between the heatmap information and information of Gaussian distribution of likelihood that is specified previously.

10. The gymnastics scoring assist system according to claim 9, wherein the processor is further configured to generate a plurality of sets of second feature group information in time series and sense an abnormal second feature based on a first vector in which a given pair of joints that are specified based on previous second feature group information serves as a start point and an end point and a second vector in which a given pair of joints that are specified based on current second feature group information serves as a start point and an end point.

11. The gymnastics scoring assist system according to claim 10, wherein the processor is further configured to sense an abnormal second feature based on a relationship between an area that is specified from a given joint based on the second feature group information and positions of joints other than the given joint.

12. The gymnastics scoring assist system according to claim 9, wherein the processor is further configured to calculate a plurality of epipolar lines using camera positions as viewpoints based on the heatmap information and sense an abnormal second feature based on a distance between an intersection of the epipolar lines and a position of a joint.

* * * * *